(12) United States Patent
Kitaji et al.

(10) Patent No.: US 8,306,565 B2
(45) Date of Patent: *Nov. 6, 2012

(54) WIRELESS COMMUNICATION TERMINAL AND CONTROL METHOD THEREOF

(75) Inventors: Mitsuhiro Kitaji, Yokohama (JP); Takashi Matsumura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/877,883

(22) Filed: Sep. 8, 2010

(65) Prior Publication Data

US 2010/0332867 A1 Dec. 30, 2010

Related U.S. Application Data

(63) Continuation of application No. 11/572,631, filed as application No. PCT/JP2005/013844 on Jul. 28, 2005, now Pat. No. 7,818,021.

(30) Foreign Application Priority Data

Jul. 30, 2004 (JP) ................................ 2004-223836
Jul. 30, 2004 (JP) ................................ 2004-223837
Jul. 30, 2004 (JP) ................................ 2004-223838

(51) Int. Cl.
 *H04B 7/00* (2006.01)
(52) U.S. Cl. .................. 455/522; 455/127.1; 455/127.2; 455/127.5; 455/574
(58) Field of Classification Search ............. 455/9, 13.4, 455/67.11, 115.1, 127.1, 127.2, 127.5, 343.1–343.6, 455/522, 550.1, 556.1, 556.2, 557, 558, 571, 455/574; 713/300, 320, 340; 370/311, 318; 340/7.32, 7.33, 7.36, 7.37; 330/285; 375/222

See application file for complete search history.

(56) References Cited

U.S. PATENT DOCUMENTS

| 5,634,132 | A |   | 5/1997 | Pearce et al. ................... 713/300 |
| 5,774,797 | A | * | 6/1998 | Kawano et al. ............. 455/127.2 |
| 6,038,432 | A | * | 3/2000 | Onoda ......................... 455/127.2 |
| 6,057,732 | A | * | 5/2000 | Morishita ..................... 330/129 |
| 6,275,715 | B1 | * | 8/2001 | Motohashi ..................... 455/574 |
| 6,330,455 | B1 |   | 12/2001 | Ichihara ........................ 455/522 |
| 6,334,050 | B1 |   | 12/2001 | Skarby |
| 6,486,738 | B2 |   | 11/2002 | Park et al. |
| 6,985,757 | B2 |   | 1/2006 | Liu et al. ....................... 455/558 |

(Continued)

FOREIGN PATENT DOCUMENTS

JP      03-054479        3/1991

(Continued)

*Primary Examiner* — Anthony Addy
(74) *Attorney, Agent, or Firm* — DLA Piper LLP (US)

(57) ABSTRACT

In a PC card communication terminal that operates supplied with power from a host device, problems such as malfunctions due to a supply voltage drop at the time of high transmission output are prevented from occurring. A baseband processor (1106) selects a transmission-power upper-limit measurement mode when a PC card terminal (1103) is to be controlled for the first time. A supply voltage drop is measured by a voltage measurement circuit (1114) while a load value of a load circuit (1112) is being changed. The load value of the load circuit (1112) when the supply voltage decreases to a permissible lowest supply voltage is obtained. Using a conversion table stored in a memory (1107), the load value is converted into a transmission output and is set as a transmission-output upper limit. In a normal communication mode, a maximum transmission output is restricted based on this transmission-output upper limit.

4 Claims, 15 Drawing Sheets

U.S. PATENT DOCUMENTS

| | | | |
|---|---|---|---|
| 7,106,569 B2 | 9/2006 | Liu et al. | 361/93.1 |
| 7,123,932 B2 * | 10/2006 | Ha | 455/522 |
| 7,139,537 B2 | 11/2006 | Nakayama | 455/127.1 |
| 7,151,914 B2 | 12/2006 | Brewer | 455/127.1 |
| 7,236,898 B2 * | 6/2007 | Kim et al. | 702/65 |
| 7,333,563 B2 * | 2/2008 | Chan et al. | 375/297 |
| 7,343,175 B2 | 3/2008 | Liu et al. | 455/557 |
| 7,539,466 B2 | 5/2009 | Tan et al. | 455/127.1 |
| 7,876,814 B2 * | 1/2011 | Rodriguez et al. | 375/222 |
| 2004/0069056 A1 | 4/2004 | Katou et al. | 73/146 |
| 2004/0204181 A1 | 10/2004 | Cromer et al. | 455/574 |

FOREIGN PATENT DOCUMENTS

| | | |
|---|---|---|
| JP | 2003-309516 | 10/2003 |
| JP | 2004-062341 | 2/2004 |
| KR | 20010066453 | 7/2001 |

* cited by examiner

WIRELESS COMMUNICATION TERMINAL AND CONTROL METHOD THEREOF

This application is a continuation of application Ser. No. 11/572,631, filed on Jan. 24, 2007, which is a national stage of international application No. PCT/JP2005/013844, filed on Jul. 28, 2005, the entire contents of which are incorporated herein by reference. This application also claims the benefit of priority under 35 USC 119 from Japanese Patent Application Nos. 2004-223836, 2004-223837, and 2004-223838 filed Jul. 30, 2004, the entire contents of which are incorporated herein by reference.

TECHNICAL FIELD

The present invention relates to a technique for controlling wireless communication terminals that are mounted in host devices and supplied with power from the host devices for operation. In particular, the present invention relates to a technique for increasing the operating reliability of a wireless communication terminal by preventing the wireless communication terminal from, for example, malfunctioning due to a drop in supply voltage at the time of high transmission output.

BACKGROUND ART

In response to recent increasing demands for the capability of data communication in mobile phone systems, a growing number of card data communication terminals are being used.

While known mobile phone terminals are supplied with power from built-in batteries for operation, PC card (PCM-CIA card) terminals are typically supplied with power by host devices, such as personal computers, because these PC card terminals do not have batteries therein due to, for example, a size restriction.

Card slots for PC cards are typically provided in portable terminals such as so-called notebook PCs and PDAs (personal information assistants). Electrical characteristics such as signals and power supply and mechanical characteristics such as size in these card slots are specified as standards (as in the PC Card Standard by the standards organizations PCM-CIA in the USA and JEITA). PC card terminals also comply with these standards. The standard for power supply specifies 3.3 V±0.3 V and a maximum of 1 A for 32-bit cards (Card Bus), for example.

In wireless communication techniques supporting recent high data communication speeds and cellular systems, unlike wireless LANs, assumed to be used in wide areas (e.g., CDMA2000 and W-CDMA), baseband processors such as high-speed CPUs and maximum transmission powers of 20 dBm (100 mW) or more are required, which leads to more power consumption. For example, in device types that employ the CDMA2000 1× technique and are rated a maximum transmission power of 23 dBm, even PC card terminals that do not have, for example, LCDs (liquid crystal displays) or backlight may exhibit a consumption current of about 1 A at the time of maximum output transmission.

For communication techniques in which terminal transmission power is controlled by a base station, such as the CDMA2000 1× technique, terminals perform transmission with the minimum required transmission power. More specifically, radio waves from a terminal located near a base station easily reach the base station, and therefore, such a terminal performs transmission (communication) with a low output. On the other hand, a terminal located distant from a base station performs transmission (communication) with a high output, which causes the current consumption to increase.

In view of these circumstances, a communication technique for reducing power consumption of mobile communication terminals is proposed, as described in, for example, Patent Document 1. In this technique, when a mobile communication terminal detects a drop in supply voltage, the network is informed of the fact, and a value smaller than normal is determined anew as the maximum transmission power required to continue communication.

Patent Document 1: Japanese Unexamined Patent Application Publication No. 2003-309516

DISCLOSURE OF INVENTION

Problems to be Solved by the Invention

In some commercially available portable terminals having card slots, the voltage of the card slots is lower than the standard value because priority is given to the operation time of the battery, or the voltage falls below the standard value at the time of high electric current (about 1 A) due to the capability of supplying electric current.

For this reason, depending on the device type of portable terminals, when a PC card terminal performs transmission (communication) with the maximum output, high electric current flows and the voltage at the PC card slot falls below the operating voltage range (normally in compliance with the standard) of the PC card terminal. This disables communication from continuing because the PC card terminal operates unstably or is reset due to the voltage drop, even though the PC card terminal itself meets the specifications of the standards.

This problem is addressed by the PC-card-terminal manufacturers that conduct compatibility (affinity) tests between the PC card terminal and, for example, commercially available portable terminals to disclose a list of, for example, operation-confirmed device types. However, non-listed portable terminals need to be tested by users themselves to see if compatibility is achieved by performing, for example, an operational check. If the operation is problematic as a result of such an operational check, it is difficult to use the PC card terminal. More specifically, a burdensome measure such as connecting a power cable to be connected to another power supply port (e.g., USB or PS/2 port) of the portable terminal and connecting an AC adaptor is required. What is worse, it is not possible to operate the PC terminal card if such a measure is not available.

The technique described in Patent Document 1 is mainly intended to address the problem of a time-lapse voltage drop due to battery consumption during communication, rather than the above-described problems. Furthermore, the same technique is not satisfactory as a countermeasure against an abrupt voltage drop produced when high transmission power occurs suddenly (e.g., when communication starts or high transmission power is required because of an object interfering with the base station during mobile communication).

The present invention has been conceived in light of these circumstances and is related to a wireless communication terminal which is mounted in a host device, such as a portable terminal, and supplied with power from the host device for operation. An object of the present invention is to increase the operating reliability of such a wireless communication terminal by eliminating the risk of the wireless communication terminal malfunctioning at the time of high transmission power due to a drop in voltage.

Means for Solving the Problems

In order to solve the above-described problem, a method of controlling a wireless communication terminal according to a first aspect of the present invention is a method of controlling a wireless communication terminal that is supplied with power supply from a host device for operation, in which the wireless communication terminal is mounted in the host device. This method includes the steps of measuring a voltage of the power supply; setting a transmission-output upper limit based on the voltage; and restricting a maximum transmission output based on the transmission-output upper limit.

In a second aspect of the present invention, the method of controlling a wireless communication terminal according to the first aspect of the present invention includes the step of measuring a drop in the voltage corresponding to current consumption while transmission is not being performed. In the step of setting the transmission-output upper limit, a transmission output that occurs when the voltage decreases to a preset permissible lowest voltage is obtained to set the transmission output as the transmission-output upper limit.

In a third aspect of the present invention, the method of controlling a wireless communication terminal according to the second aspect of the present invention is characterized in that in the step of measuring the drop in the voltage, the drop in the voltage is measured via a load value of a load circuit, the load value being variable, while the voltage is applied to the load circuit, and in the step of setting the transmission-output upper limit, the transmission-output upper limit is set by converting the load value into a transmission output.

In a fourth aspect of the present invention, the method of controlling a wireless communication terminal according to the second aspect of the present invention is characterized in that in the step of measuring the drop in the voltage, the drop in the voltage is set by measuring the drop in the voltage with a terminating circuit for terminating a transmission output being connected to a transmission circuit.

In a fifth aspect of the present invention, the method of controlling a wireless communication terminal according to the first aspect of the present invention is characterized in that the wireless communication terminal includes a transmission-output upper-limit mode in which the transmission-output upper limit is set and the set transmission-output upper limit is transmitted to the host device and saved; and a normal communication mode in which the maximum transmission output is restricted based on the transmission-output upper limit received from the host device. One of the transmission-output upper-limit mode and the normal communication mode is selected.

In a sixth aspect of the present invention, the method of controlling a wireless communication terminal according to the first aspect of the present invention is characterized in that in the step of measuring the voltage, the voltage is measured during transmission operation to acquire voltage measurement values corresponding to different transmission output values. Furthermore, the method includes the steps of converting the transmission output values into current consumption values; and estimating a current consumption value corresponding to a preset permissible lowest voltage based on the voltage values and the current consumption values. In addition, in the step of setting the transmission-output upper limit, the estimated current consumption value is converted back into a transmission output value to set the transmission output value as the transmission-output upper limit.

In a seventh aspect of the present invention, the method of controlling a wireless communication terminal according to the first aspect of the present invention is characterized in that in the step of measuring the voltage, transmission operation is performed with a transmission output lower than a transmission output requested at the time of a first transmission operation, and subsequently, the voltage measurement values are acquired while the transmission output is increased in a stepwise manner.

In an eighth aspect of the present invention, the method of controlling a wireless communication terminal according to the first aspect of the present invention is characterized in that in the step of measuring the voltage, a voltage value of the power supply is measured during transmission operation, and in the step of setting the transmission-output upper limit, a transmission output value during transmission operation exhibited when the measured voltage value falls below a threshold value larger than a preset permissible lowest voltage value is set as the transmission-output upper limit.

In a ninth aspect of the present invention, the method of controlling a wireless communication terminal according to the first aspect of the present invention is characterized in that a maximum transmission output value with which transmission has been performed is stored as a maximum transmission-output history value before the step of measuring a voltage value of the power supply; and if a transmission output with which transmission is to be performed exceeds the maximum transmission-output history value, the transmission output is restricted to a value produced by adding a predetermined increment value to the maximum transmission-output history value, and after the transmission, the maximum transmission-output history value is updated.

A tenth aspect of the present invention provides a program for a wireless communication terminal to achieve the method of controlling a wireless communication terminal according to the first aspect of the present invention.

An eleventh aspect of the present invention is a wireless communication terminal mounted in a host device and supplied with power supply from the host device for operation. This wireless communication terminal includes a supply-voltage measurement section for measuring a voltage value of the power supply; a transmission-output upper-limit setting section for setting a transmission-output upper limit based on the voltage value; and a transmission-output control section for restricting a maximum transmission output based on the transmission-output upper limit.

In a twelfth aspect of the present invention, the wireless communication terminal according to the eleventh aspect of the present invention includes a load circuit having a variable load value; a power-supply-connection switching section for switching a connection of the power supply between a transmission circuit and the load circuit; a load-value setting section for determining a load value exhibited when the voltage measured by the supply-voltage measurement section while the load value of the load circuit is being changed decreases to a preset permissible lowest voltage value; and a transmission-output upper-limit conversion section for converting the load value determined by the load setting section into the transmission-output upper limit based on a conversion table of a preset load value and the transmission-output upper limit.

In a thirteenth aspect of the present invention, the wireless communication terminal according to the eleventh aspect of the present invention includes a terminating circuit for terminating a transmission output; and an output-stage switching section for switching a connection of an output stage between an antenna and the terminating circuit. In this wireless communication terminal, the transmission-output upper-limit setting section determines, as the transmission-output upper limit, a transmission output value exhibited when the voltage measured by the supply-voltage measurement section while the transmission output is being changed decreases to a preset permissible lowest voltage value.

In a fourteenth aspect of the present invention, in the wireless communication terminal according to the eleventh aspect of the present invention, the supply-voltage measurement section measures voltage values corresponding to different transmission output values during transmission operation. This wireless communication terminal includes a transmission-output/current relationship storage section storing a correspondence between a transmission output and current consumption; and a current-consumption-value estimation section for estimating a current consumption value corresponding to a preset permissible lowest voltage value based on the measured voltage values and current consumption values obtained by converting the transmission output values using the correspondence in the transmission-output/current relationship storage section. Furthermore, in this wireless communication terminal, the transmission-output upper-limit setting section converts the current consumption value estimated by the current-consumption-value estimation section back into a transmission output value to set the transmission output value as the transmission-output upper limit.

In a fifteenth aspect of the present invention, in the wireless communication terminal according to the eleventh aspect of the present invention, the supply-voltage measurement section measures voltage values corresponding to different transmission output values during transmission operation, and the transmission-output upper-limit setting section sets, as the transmission-output upper limit, a transmission output value during transmission operation exhibited when the measured voltage value falls below a threshold value larger than a preset permissible lowest voltage value.

Advantageous Effects of the Invention

As described above, according to the present invention, a transmission-output upper limit up to which the wireless communication terminal can operate normally is set assuming power supplied from the host device, and the maximum transmission output of the wireless communication terminal is restricted based on this transmission-output upper limit. Therefore, even if the performance of power supplied from the host device is low, transmission operation can be performed within an output range adjusted to the performance of the power supply. This prevents the wireless communication terminal from exhibiting an abnormal operation or experiencing shutdown or communication breakdown, thereby enhancing the operating reliability. Therefore, irrespective of a transmission output increased by an abrupt change in communication environments, the operating reliability is prevented from decreasing.

Furthermore, since the transmission-output upper limit is set in accordance with the actual performance of the power supplied from the host device to the wireless communication terminal, a problem with compatibility in power supply performance between the host device and the wireless communication terminal can be overcome, thereby eliminating the burden of conducting a compatibility test. Moreover, even in a case where the conventional wireless communication terminal could not be used as-is due to insufficient power supply performance, the wireless communication terminal can now be used without the burdensome work of securing power for the wireless communication terminal by connecting to another power supply port using, for example, a connection cable.

In addition, a transmission-output upper limit can be obtained without requiring a high-output transmission operation by applying supply voltage to a load circuit with variable load values or measuring the drop in supply voltage while a terminating circuit is connected to the output stage of the wireless communication terminal.

Furthermore, according to the structure where the above-described load circuit is employed, since it is not necessary to provide, for example, a switching element at the output stage of the wireless communication circuit, the present invention can be applied without causing loss at the output stage.

In addition, according to the structure where the terminating circuit is connected to the output stage of the wireless communication terminal, it is not necessary to prepare, for example, a load circuit separately from the wireless communication circuit. This affords an advantage in that the present invention can be applied on a small circuit scale.

Furthermore, the wireless communication terminal measures the transmission-output upper limit upon receiving an instruction from the host device, whereas the host device saves the transmission-output upper limit acquired from the wireless communication terminal. In this manner, transmission-output upper limit measurement operation by the wireless communication terminal can be minimized by supplying the saved transmission-output upper limit to the wireless communication terminal for communication processing during normal operation and, as required, by instructing the wireless communication terminal to measure a transmission-output upper limit. By doing so, a time loss accompanying transmission-output upper-limit measurement operation is suppressed, thereby affording an advantage in that if the host device is driven on a built-in battery, saving in the built-in battery is achieved.

In addition, according to the present invention, a transmission-output upper limit up to which the wireless communication terminal can operate normally is set assuming power supplied from the host device, and the maximum transmission output of the wireless communication terminal is restricted based on this transmission-output upper limit. Therefore, even if the performance of power supplied from the host device is low, transmission operation can be performed within an output range adjusted to the performance of the power supply. This prevents the wireless communication terminal from exhibiting an abnormal operation or experiencing shutdown or communication breakdown, thereby enhancing the operating reliability. Therefore, irrespective of a transmission output increased by an abrupt change in communication environments, the operating reliability is prevented from decreasing.

Furthermore, since the transmission-output upper limit is set in accordance with the actual performance of the power supplied from the host device to the wireless communication terminal, a problem with compatibility in power supply performance between the host device and the wireless communication terminal can be overcome, thereby eliminating the burden of conducting a compatibility test. Moreover, even in a case where the conventional wireless communication terminal could not be used as-is due to insufficient power supply performance, the wireless communication terminal can now be used without the burdensome work of securing power for the wireless communication terminal by connecting to another power supply port using, for example, a connection cable.

Furthermore, supply voltage is measured during transmission operation to acquire supply voltage measurement values at different transmission outputs, and from these supply voltage measurement values a current consumption value corresponding to the permissible lowest supply voltage value is estimated to set a transmission-output upper limit. Therefore, a transmission-output upper limit can be obtained without high-output transmission operation.

In addition, if transmission operation is carried out with a low transmission output regardless of the transmission output requested at the time of the first transmission operation, the subsequent transmission operation is carried out while the transmission output is being increased in a stepwise manner, and supply voltage measurement values are acquired during these transmission operations, then a transmission-output upper limit can be set based on information acquired during actual transmission operation. This eliminates the need for adding, for example, transmission operation for the purpose of acquiring a transmission-output upper limit. Moreover, it is possible to prevent, for example, the wireless communication terminal from being reset as a result of a high transmission output being requested before a transmission-output upper limit is determined.

In addition, since even a host device with low power supply performance can assure the wireless communication terminal of operating reliability, and furthermore, only a small amount of electrical power is sufficient to acquire a transmission-output upper limit, PC-card built-in wireless communication terminals that can be mounted in PC card slots provided mainly in portable information terminals are preferably applicable.

In addition, according to the present invention, a transmission power upper limit up to which the wireless communication terminal can operate normally is set assuming power supplied from the host device, and the maximum transmission power of the wireless communication terminal is restricted based on this transmission power upper limit. Therefore, even if the performance of power supplied from the host device is low, transmission operation can be performed within an output range adjusted to the performance of the power supply. This prevents the wireless communication terminal from exhibiting an abnormal operation or experiencing shutdown or communication breakdown, thereby enhancing the operating reliability. Therefore, irrespective of transmission power increased by an abrupt change in communication environments, the operating reliability is prevented from decreasing.

Furthermore, since the transmission power upper limit is set in accordance with the actual performance of the power supplied from the host device to the wireless communication terminal, a problem with compatibility in power supply performance between the host device and the wireless communication terminal can be overcome, thereby eliminating the burden of conducting a compatibility test. Moreover, even in a case where the conventional wireless communication terminal could not be used as-is due to insufficient power supply performance, the wireless communication terminal can now be used without the burdensome work of securing power for the wireless communication terminal by connecting to another power supply port using, for example, a connection cable.

In addition, a threshold with a margin for the permissible lowest supply voltage value is preset and supply voltage is measured during transmission so that when the supply voltage measurement value falls below the threshold, the transmission power during the transmission is set to the transmission power upper limit. For this reason, a transmission power upper limit can be obtained without high-output transmission operation.

Furthermore, if transmission is carried out with low transmission power regardless of the transmission power requested during transmission and the subsequent transmission operation is carried out while the transmission power is being increased in a stepwise manner to update the maximum transmission power history value, then it is possible to prevent, for example, the wireless communication terminal from being reset as a result of high transmission power being requested before a transmission power upper limit is determined In addition, since even a host device with low power supply performance can assure the wireless communication terminal of operating reliability, and furthermore, only a small amount of electrical power is sufficient to acquire a transmission power upper limit, PC-card built-in wireless communication terminals that can be mounted in PC card slots provided mainly in portable information terminals are preferably applicable.

DESCRIPTION OF REFERENCE SYMBOLS 1101, 2101, 3101: host device
1102, 2102, 3102: PC card slot
1103, 2103, 3103: PC card terminal
1104, 2104, 3104: Card Bus connector
1106, 2106, 3106: baseband processor
1107, 2107, 3107: memory
1108, 2108, 3108: transmission circuit
2112, 3112: transmission-output upper-limit estimation section
2113, 3113: power supply circuit
2114, 3114: voltage measurement circuit
1201: D/A converter
1202, 1203: transistor
1204: capacitor
1205: diode
1401: terminating circuit
1402: switch
1501: resistor
1502: coil
1503: capacitor
S1301 to S1314: steps carried out by a baseband processor in a first embodiment
S1601 to 1613: steps carried out by a baseband processor in a second embodiment
S2101 to S2109: steps for communication processing in a fourth embodiment
S2201 to 2208: steps for communication processing in a fifth embodiment
S2301 to 2308: steps for communication processing in a sixth embodiment
S3101 to S3104: steps for communication processing in a seventh embodiment
S3201 to 33210: steps for communication processing in an eighth embodiment

BEST MODE FOR CARRYING OUT THE INVENTION

Embodiments according to the present invention will now be described with reference to the drawings. The current description assumes examples where a 32-bit PC card communication terminal in accordance with the CDMA2000 1xEV-DO standard is used.

Figure 1:
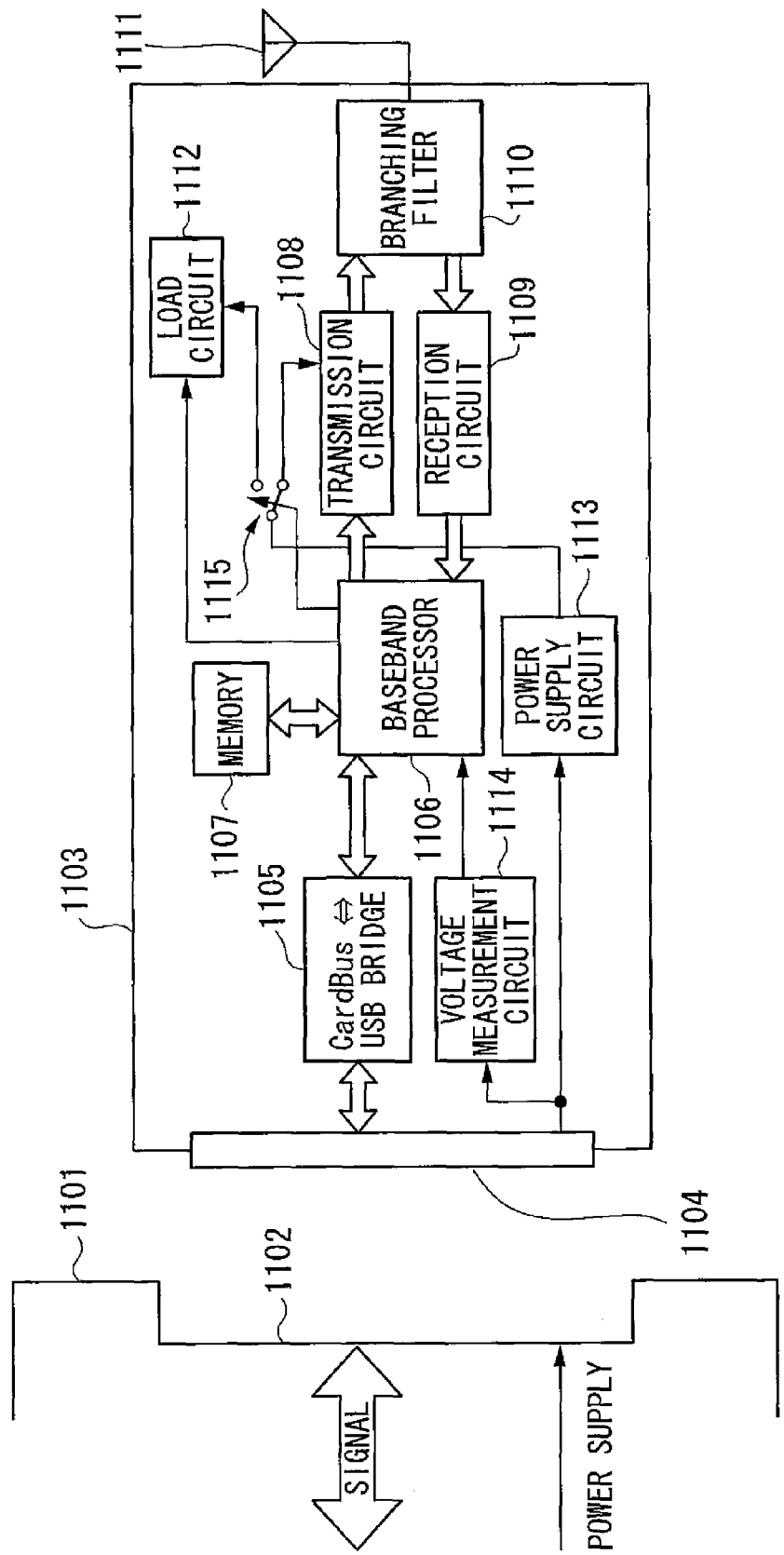
FIG. 1 is a schematic block diagram depicting the structure of a PC card communication terminal according to a first embodiment of the present invention.

FIG. 1 is a schematic block diagram depicting the structure of a PC card communication terminal according to a first embodiment of the present invention. In the same figure, reference numeral 1101 denotes a host device, such as a so-called notebook PC, having a PC card slot 1102. Reference numeral 1103 denotes a PC card terminal which includes a 32-bit Card Bus connector 1104. This PC card terminal 1103 is mounted in the host device 1 for use and is supplied with power from the host device 1101 to operate, controlled using, for example, the AT command.

In this PC card terminal 1103, reference numeral 1105 denotes a bridge that connects a Card Bus and a USB (universal serial bus), reference numeral 1106 denotes a baseband processor that performs communication control, reference numeral 1107 denotes a memory used by the baseband processor 1106, reference numeral 1108 denotes a transmission circuit, reference numeral 1109 denotes a reception circuit, reference numeral 1110 denotes a branching filter, and reference numeral 1111 denotes an antenna. These components are realized by a general structure, and a description thereof will be omitted. Reference numeral 1112 denotes a load circuit whose load value changes under the control of the baseband processor 1106. A specific example of this load circuit will be described later. The line of power supplied from the host device 1101 is connected to a power supply circuit 1113 and a voltage measurement circuit 1114. The power supply circuit 1113 produces voltage to be supplied to components in the card terminal. In the figure, only the power supply routes to the transmission circuit 1108 and to the load circuit 1112 are shown; power supply routes to other circuits are omitted. The voltage measurement circuit 1114 measures a supply voltage under the control of the baseband processor 1106.

Furthermore, reference numeral 1112 denotes a transmission-output upper-limit estimation section that estimates a transmission-output upper limit, which will be described later. If the baseband processor 1106 and a DSP (digital signal processor), not shown in the figure, are made to read a predetermined program and employ, for example, a method for carrying out the above-described estimation processing, the transmission-output upper-limit estimation section can be realized with an existing hardware configuration.

Figure 2:
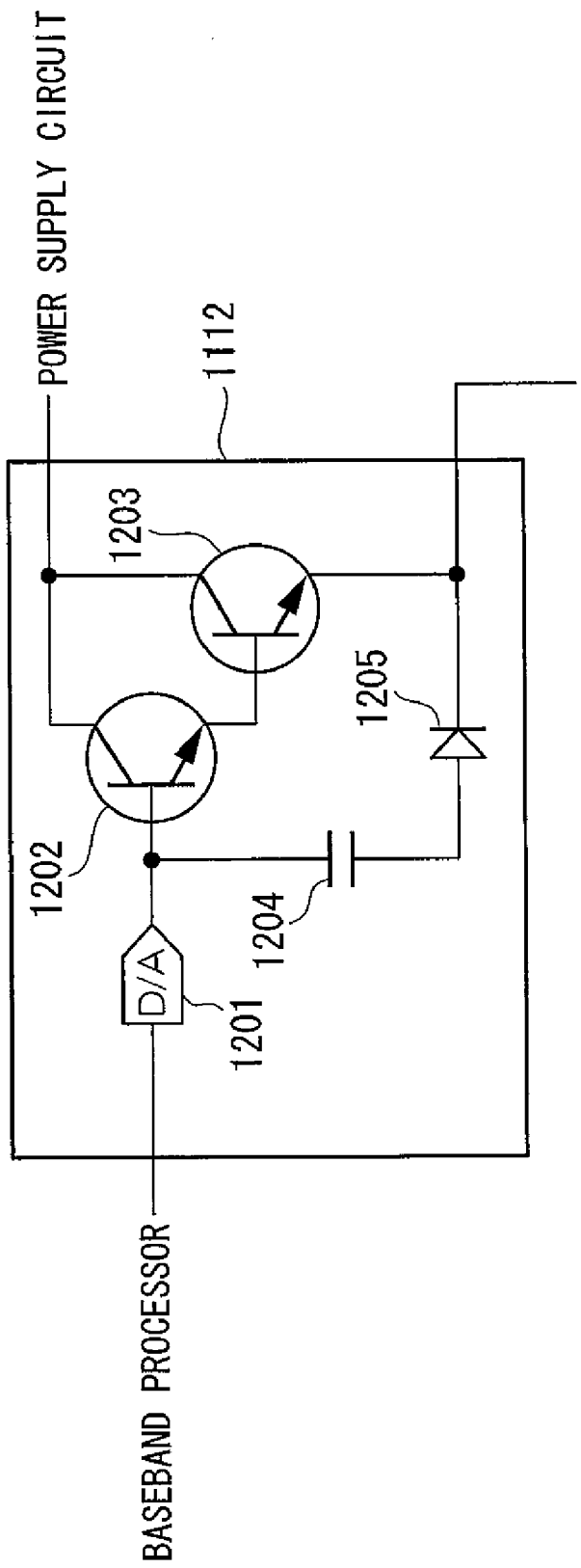
FIG. 2 is a circuit diagram depicting one specific example of a load circuit according to the present invention.

FIG. 2 is a circuit diagram depicting one specific example of the load circuit 1112. In the same figure, reference numeral 1201 denotes a D/A converter that performs D/A (digital/analog) conversion of a control signal from the baseband processor. Reference numerals 1202 and 1203 denote npn transistors. Supply voltage from the power supply circuit is applied to the collector of each of the transistors 1202 and 1203. An output terminal of the D/A converter 1201 is connected to the base of the transistor 1202. The emitter of the transistor 1202 is connected to the base of the transistor 1203. The emitter of the transistor 1203 is connected to the ground. A series circuit composed of a capacitor 1204 and a diode 1205 connected in series is interposed between the base of the transistor 1202 and the ground.

Referring back to FIG. 1, power from the power supply circuit 1113 is supplied selectively to the load circuit 1112 or the transmission circuit 1108 under the control of the baseband processor 1106. This may be achieved by means of a switch 1115 provided outside the power supply circuit 1113, as shown in the figure, or by turning ON/OFF individual supply voltages from the power supply circuit 1113 controlled by the baseband processor 1106.

Figure 3:
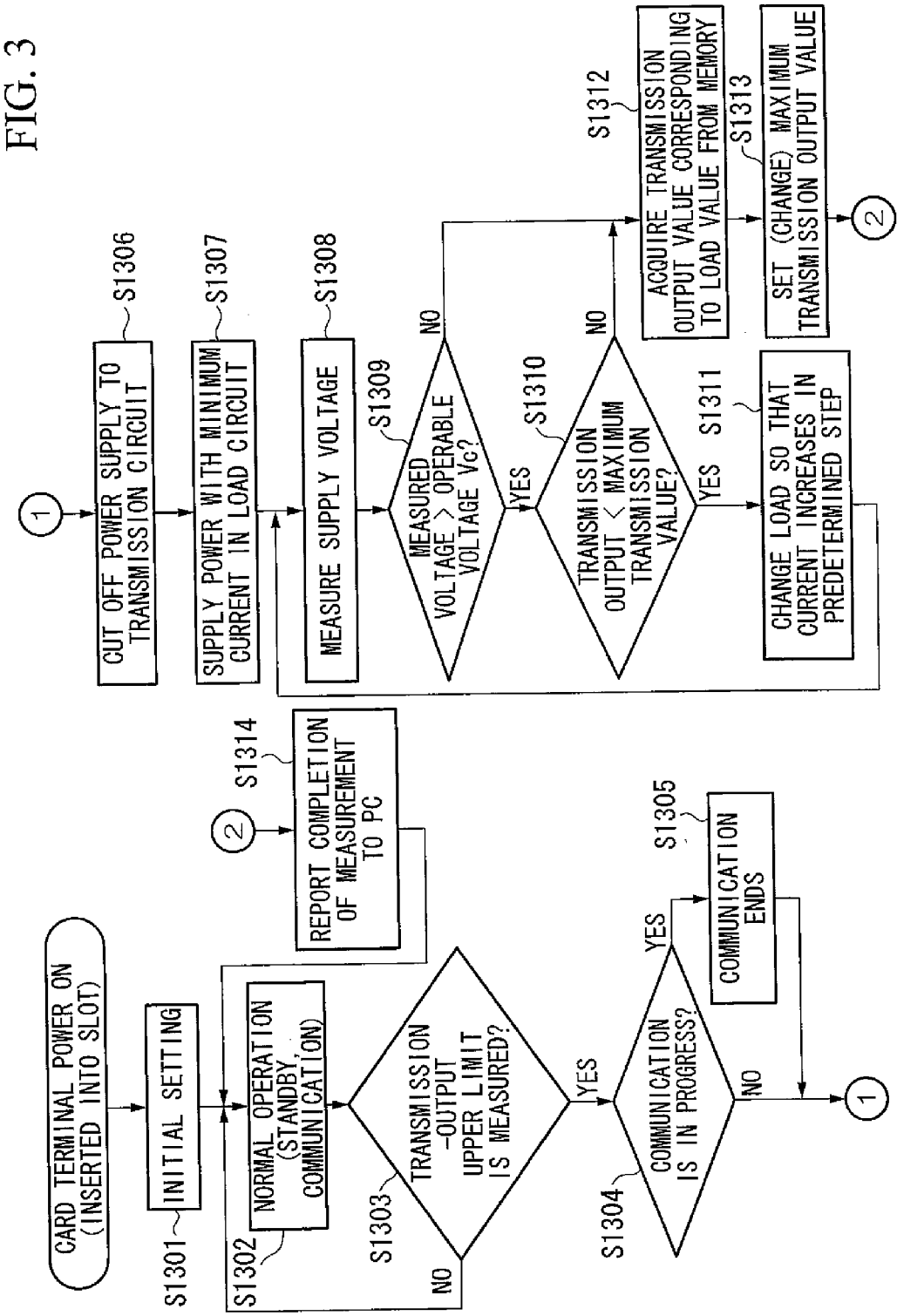
FIG. 3 is a flowchart illustrating the main part for communication control according to the first embodiment of the present invention.

The operation of the card communication terminal according to this embodiment will now be described. FIG. 3 is a flowchart illustrating the main part for communication control by the baseband processor. Referring to FIGS. 1 and 3, when the power supply is turned ON by inserting the PC card terminal 1103 into the PC slot 1102 of the host device 1101, the baseband processor 1106 starts up and carries out predetermined initial setting first (S1301). The baseband processor 1106 then carries out standby/communication processing in a normal mode (S1302). In the normal mode, communication is achieved by supplying power to the transmission circuit 1108 and performing transmission and reception with the base station.

In this case, when an instruction for measuring a transmission power upper limit is given from the host device to the PC card terminal 1103 using PC card terminal control means, such as the AT command, via a user operation or driver function (S1303: Yes), the baseband processor 1106 enters a transmission-power upper-limit measurement mode. In this transmission-power upper-limit measurement mode, the baseband processor 1106 follows the procedure described below to carry out processing. First, if communication is in progress (S1304: Yes), the communication processing is terminated (S1305). Then, the switch 1115 is operated or the power supply circuit 1113 is controlled to cut off the power to the transmission circuit 1108 (S1306), and furthermore power supply to the load circuit 1112 is started (S1307). In this case, the load circuit 1112 is controlled so as to start operation with an initial load value that produces a minimum current setting.

In this state, a measurement voltage value is acquired from the voltage measurement circuit 1114 (S1308), and the measurement voltage value is compared with an operable voltage value preset as a lowest voltage value with which the PC card terminal can operate (S1309). If the measurement voltage value is larger (S1309: Yes), the load value of the load circuit 1112 is changed to increase the electric current (S1311) and measurement is carried out again. In this manner, the same procedure is repeated by returning to step S1308 until the measurement voltage value decreases to the operable voltage value (S1309: No) or the load value reaches a load value corresponding to the predetermined maximum current (S1310: No).

When the measurement voltage decreases to the operable voltage (S1309: No) or the load value reaches a load value corresponding to the maximum current (S1310: No) in this manner, the baseband processor 1106 refers to a load-value/transmission-output conversion table pre-stored in the memory 1107, acquires a transmission output corresponding to the load value of the load circuit 1112 (S1312), and stores this value as a transmission-output upper limit of the PC card terminal 1103 in the host device 1101 (S1313). Thereafter, measurement completion is reported to the host device using, for example, a result code of the AT command (S1314) to return to the normal mode (S1302). The CDMA2000 1xEV-DO standard follows a procedure where the base station makes a request to the PC card terminal 1103 for a transmission output. In the normal mode, however, the baseband processor 1106 compares the transmission output requested by the base station with the above-described transmission-output upper limit, and even when a transmission output higher than the transmission-output upper limit is required (including a case where an output value under open-loop or closed-loop control exceeds the transmission-output upper limit), the transmission output is restricted to the transmission-output upper limit to prevent the supply voltage from falling below the operable voltage value.

For the relationship between load values of the load circuit 1112 and transmission outputs, electric currents for transmission outputs of the transmission circuit 1108 and electric currents for loads of the load circuit 1112 are measured for a certain number of units or all units when the PC card terminal 1103 is manufactured to track them as representative values or individual adjustment values, so that the load-value/transmission-output conversion table is produced based on this data. Furthermore, the operable voltage used in step S1309 of FIG. 3 can simply be preset in accordance with, for example, the above-described standards. In addition, for the load value corresponding to the maximum current used in step S1310 of FIG. 3, it is sufficient to set a load value corresponding to the maximum current value determined, for example, from hardware restrictions of the PC card terminal 1103 itself or output restrictions imposed by laws and regulations. Furthermore, for the initial load value used in step S1307, it is sufficient to set a load value corresponding to the minimum current determined by taking into consideration a safety margin that is wide enough to prevent the supply voltage from falling below the operable voltage even if the power supply performance of the host device 1101 is lower than the standard. These data are stored in a nonvolatile portion of the memory 1107.

Figure 4:
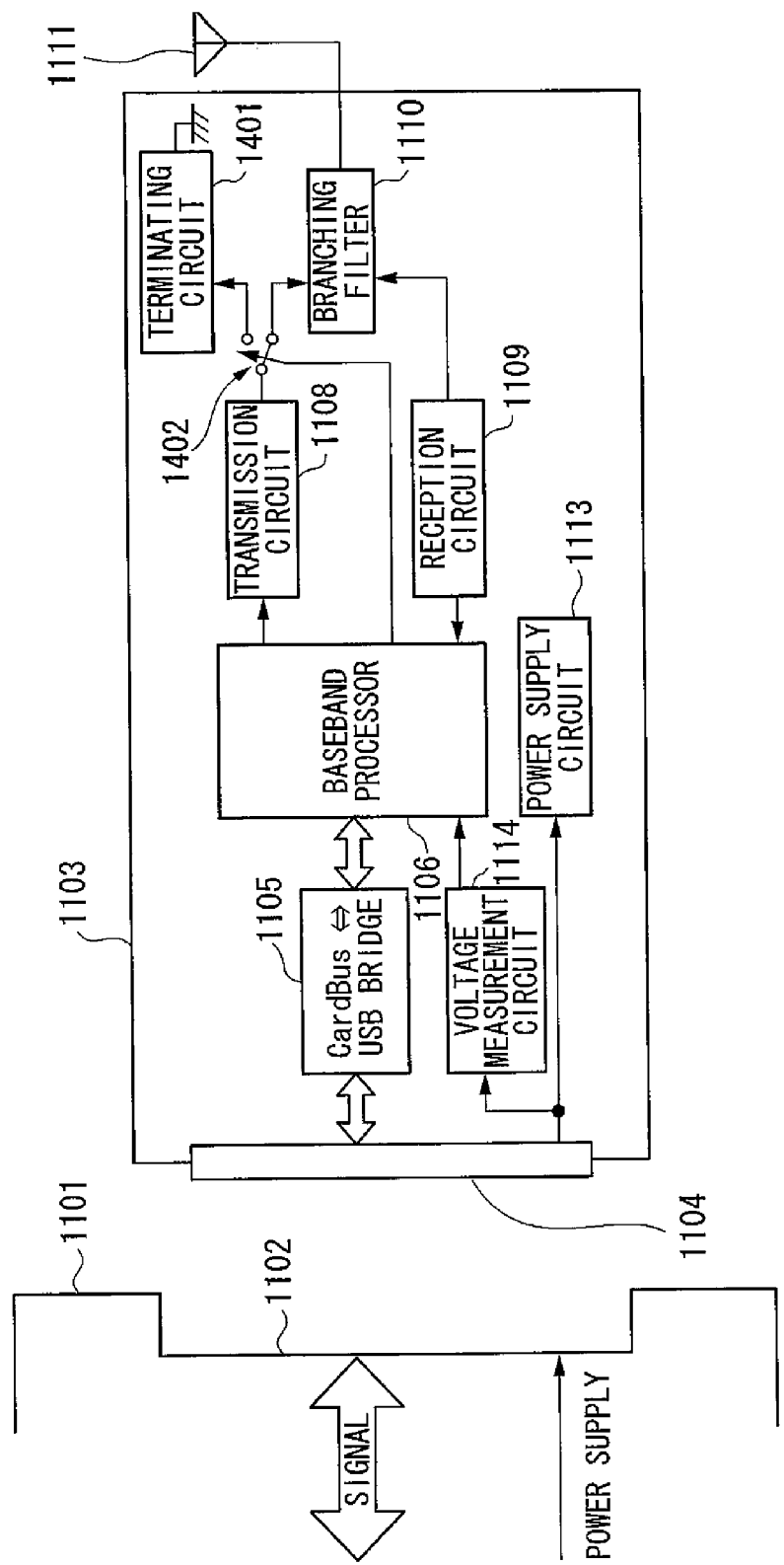
FIG. 4 is a block diagram of a PC card communication terminal according to a second embodiment of the present invention.

A second embodiment of the present invention will now be described. FIG. 4 is a block diagram depicting a PC card communication terminal according to the second embodiment. As shown in the same figure, in the second embodiment, there are provided a terminating circuit 1401 that absorbs transmission outputs of the transmission circuit 1108 to nullify them and a switch 1402 that selectively connects the output terminal of the transmission circuit 1108 to either the branching filter 1110 or the terminating circuit 1401 according to an instruction of the baseband processor 1106. On the other hand, the load circuit 1112 and the switch 1115 (refer to FIG. 1) provided in the first embodiment are not necessary. Other components are the same as those in the first embodiment, and thus a description thereof will be omitted.

Figure 5:
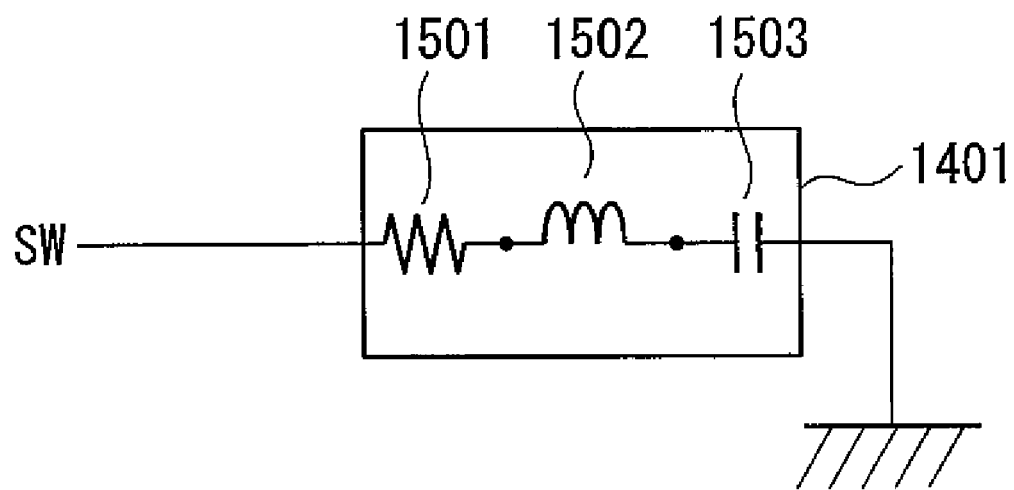
FIG. 5 is a circuit diagram depicting one specific example of a terminating circuit according to the present invention.

FIG. 5 is a circuit diagram depicting one specific example of the terminating circuit. As shown in the same figure, the terminating circuit 1401 can be realized by interposing a series circuit composed of, for example, a resistor 1501, a coil 1502, and a capacitor 1503 between the input terminal and the ground.

Figure 6:
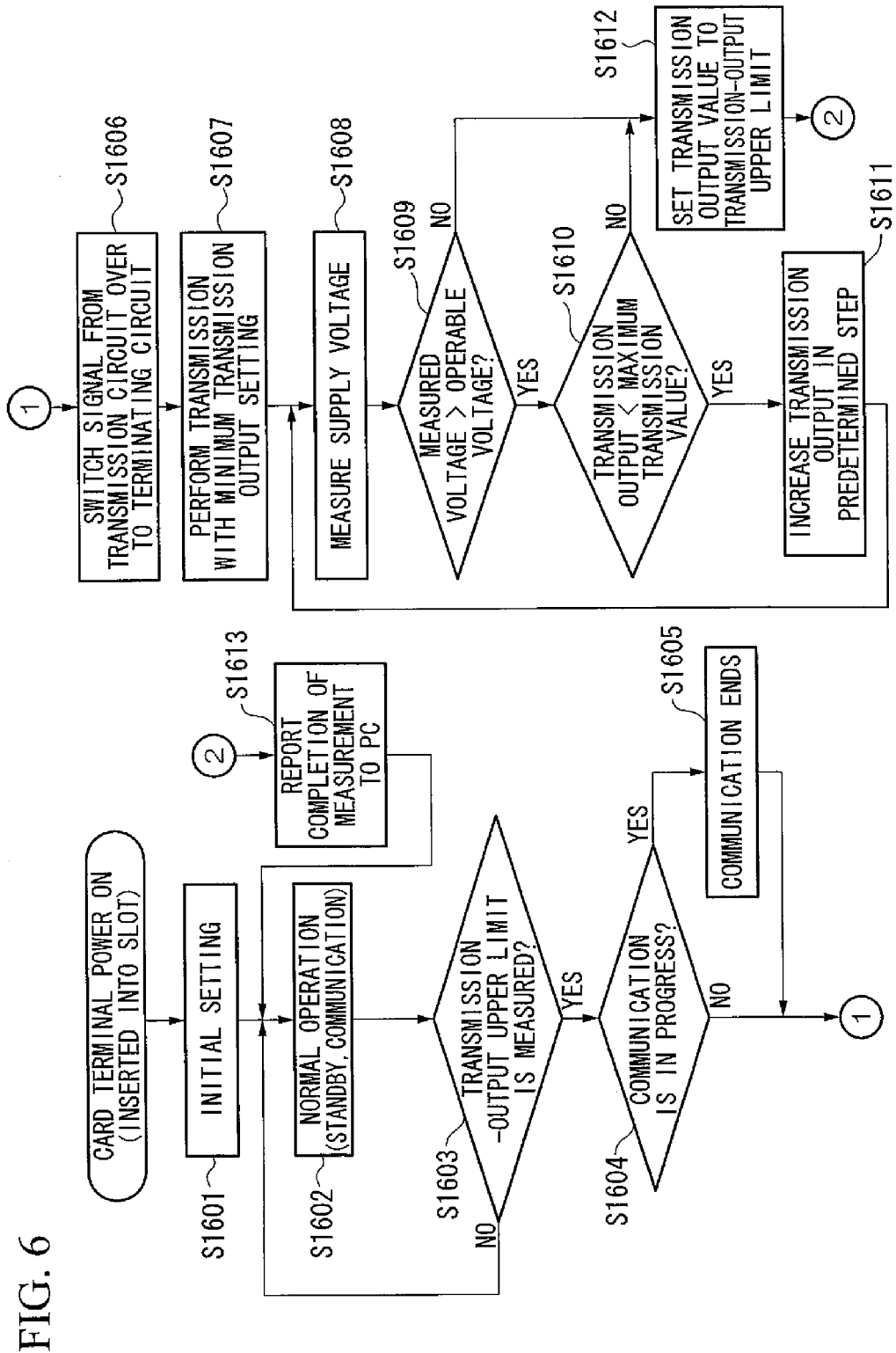
FIG. 6 is a flowchart illustrating the main part for communication control according to the second embodiment of the present invention.

The operation of the baseband processor 1106 according to the second embodiment will be described. FIG. 6 is a flowchart illustrating the main part for communication control by the baseband processor according to the second embodiment.

Referring to FIGS. 4 and 6, when the power supply is turned ON by inserting the PC card terminal 1103 into the PC slot 1102 of the host device 1101, the baseband processor 1106 starts up and carries out predetermined initial setting first (S1601). The baseband processor 1106 then carries out standby/communication processing in a normal mode (S1602). In normal mode communication, the switch 1402 is switched over to the branching filter 1110 to connect the output terminal of the transmission circuit 1108 to the branching filter 1110 so that communication is achieved by performing transmission and reception with the base station.

In this case, if an instruction for measuring a transmission power upper limit is issued from the host device (S1603: Yes), the baseband processor 1106 enters the transmission-power upper-limit measurement mode, and if communication is in progress (S1604: Yes), the communication processing is terminated (S1605). Thereafter, the switch 1402 is operated to connect the output terminal of the transmission circuit 1108 to the terminating circuit 1401.

In this state, the transmission circuit 1108 is controlled to perform transmission operation with a minimum current setting (S1607), and a measurement voltage value is acquired from the voltage measurement circuit 1114 (S1608). If the measurement voltage value is higher than the operable voltage value (S1609: Yes) and the transmission output is lower than the maximum transmission output value (S1610: No), the flow returns to step 1608 to repeat the same procedure.

Then, when the measurement voltage value decreases to the operable voltage value (S1609: No) or the transmission output reaches the maximum transmission output value (S1610: No), the baseband processor 1106 stores the transmission output value at this time as a transmission-output upper limit. (S1612). Subsequently, measurement completion is reported to the host device (S1613) to return to the normal mode (S1602).

A third embodiment of the present invention will now be described. It is assumed that the host device has a preinstalled OS (operating system) which provides a function for detecting a PC card terminal mounted in the PC card slot.

When the PC card terminal is inserted in the PC card slot for the first time, the host device reads out information such as the device type from the PC card terminal to install the corresponding driver software. Thereafter, each time the same card terminal is inserted in the card slot, the host device reads out the corresponding driver software from, for example, the hard disk to control the card terminal via the driver software. The driver software for the card terminal operates as follows.

When driver software is installed (the first time the PC card terminal is controlled), the driver software at least once instructs the PC card terminal to measure a transmission-output upper limit. The PC card terminal determines a transmission-output upper limit by following the same procedure as in the first or second embodiment and reports the transmission-output upper limit to the driver software using, for example, a result code of the AT command.

The driver software saves the reported transmission-output upper limit as information specific to that PC card terminal. Subsequently, when the PC card terminal is inserted in the same host device, the driver software transmits the saved transmission-output upper limit to the PC card terminal. The PC card terminal stores the received transmission-output upper limit to restrict the transmission output via communication control.

With the above-described structure, a transmission-output upper limit is measured only when the PC card terminal is used for the first time, thereby suppressing power consumption by, for example, the notebook personal computer functioning as the host device.

Embodiments according to the present invention will now be described with reference to the drawings. The current description assumes examples where a 32-bit PC card communication terminal in accordance with the CDMA2000 1xEV-DO standard is used.

Figure 7:
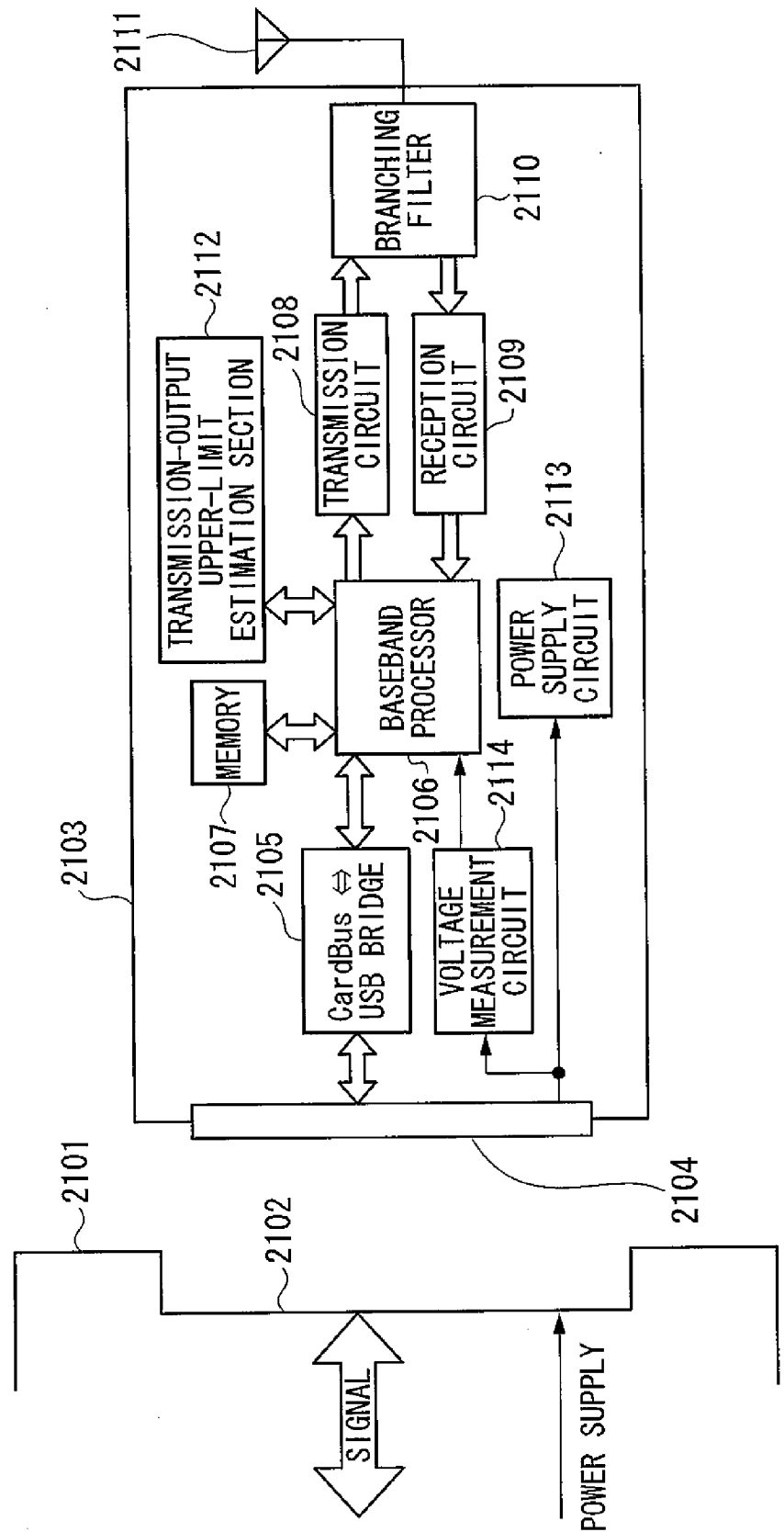
FIG. 7 is a schematic block diagram depicting the structure of a PC card communication terminal according to a fourth embodiment of the present invention.

FIG. 7 is a schematic block diagram depicting the structure of a PC card communication terminal according to a fourth embodiment of the present invention. In the same figure, reference numeral 2101 denotes a host device, such as a so-called notebook PC, having a PC card slot 2102. Reference numeral 2103 denotes a PC card terminal which includes a 32-bit Card Bus connector 2104. This PC card terminal 2103 is mounted in the host device 1 for use and is supplied with power from the host device 2101 to operate, controlled using, for example, the AT command.

In this PC card terminal 2103, reference numeral 2105 denotes a bridge that connects a Card Bus and a USB (universal serial bus), reference numeral 2106 denotes a baseband processor that performs communication control, reference numeral 2107 denotes a memory used by the baseband processor 2106, reference numeral 2108 denotes a transmission circuit, reference numeral 2109 denotes a reception circuit, reference numeral 2110 denotes a branching filter, and reference numeral 2111 denotes an antenna. These components are realized by a general structure, and a description thereof will be omitted. Reference numeral 2112 denotes a transmission-output upper-limit estimation section that performs estimation processing of a transmission-output upper limit, which will be described later. If the baseband processor 2106 and a DSP (digital signal processor), not shown in the figure, are made to read a predetermined program and employ, for example, a method for carrying out the above-described estimation processing, the transmission-output upper-limit estimation section can be realized with an existing hardware configuration.

The line of power supplied from the host device 2101 is connected to a power supply circuit 2113 and a voltage measurement circuit 2114. The power supply circuit 2113 produces voltage to be supplied to components in the card terminal. Power supply routes to components are not shown in the figure. The voltage measurement circuit 2114 measures a supply voltage under the control of the baseband processor 2106.

Figure 8:
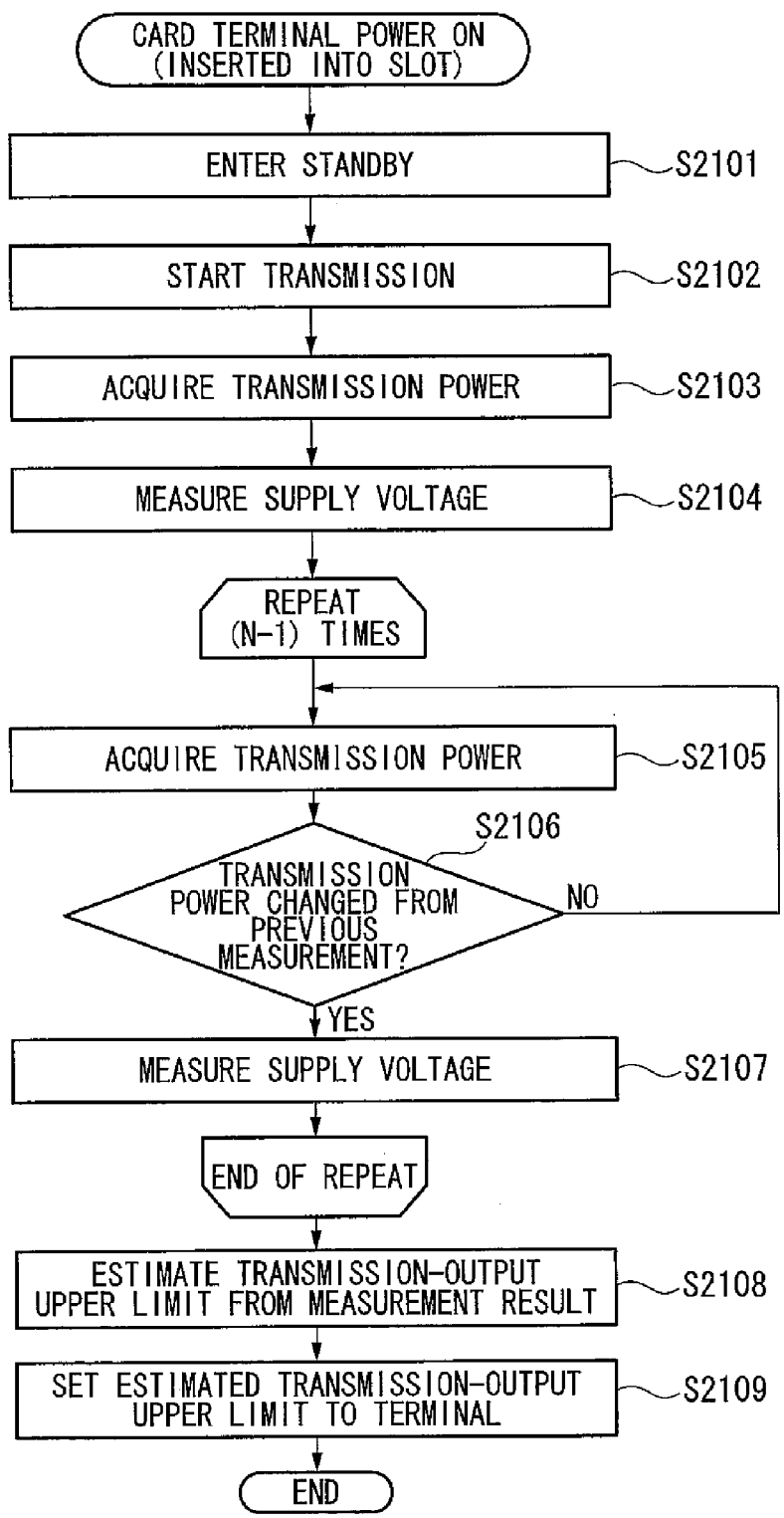
FIG. 8 is a flowchart illustrating the main part for communication control according to the fourth embodiment of the present invention.

The operation of the card communication terminal according to this embodiment will now be described. FIG. 8 is a flowchart illustrating the main part for communication control according to the fourth embodiment. Referring to FIGS. 7 and 8, when the power supply of the PC card terminal 2103 is turned ON by inserting the PC card terminal 2103 in the PC slot 2102 of the host device 2101, the baseband processor 2106 starts up and is subsequently controlled by the host device 2101 using, for example, the AT command.

In this manner, a search is made for a base station and standby operation is started as with a normal terminal (S2101). When the terminal starts transmission (S2102), such as when a base station is found and registration in the base station is performed to start to standby operation or when a call is originated during standby operation, the transmission power is acquired (S2103), and at the same time, the voltage supplied from the host device 2101 is measured by the voltage measurement circuit 2114 (S2104).

The baseband processor 2106 stores this measurement value in the memory 2107 and acquires transmission power again (S2105). The transmission power acquired at this time is compared with the previously acquired transmission power to determine if there is a change (S2106). If there is no change, monitoring the transmission power for any change is continued (S2106: No). If there is a change in the transmission power (S2106: Yes), the supply voltage is measured again by the voltage measurement circuit 2114 (S2107). The processing from steps S2105 to S2107 is repeated N−1 times, where N (2) represents a value preset as the number of times the supply voltage needs to be measured to estimate a transmission-output upper limit.

When N measurement values of supply voltage at different transmission power levels are acquired as a result of the above-described processing, the transmission-output upper-limit estimation section 2112 calculates a transmission-output upper limit using these N measurement values (S2108). The transmission-output upper limit is an upper limit of transmission output for restricting the drop in supply voltage to within a range in which the supply voltage does not fall below the permissible lowest supply voltage of the PC card terminal 2103. This transmission-output upper limit is determined depending on the relationship between the supply voltage supplied from the host device 2101 and the characteristics of the current consumption of the PC card terminal (particularly the transmission circuit 2108).

With this transmission-output upper limit, setting for limiting the maximum transmission power of the PC card terminal 2103 is performed (S2109), and then a series of operations ends. In the CDMA2000 1xEV-DO standard, the base station restricts a transmission output to the PC card terminal 2103. However, after a transmission-output upper limit has been acquired through the above-described series of operations, the baseband processor 2106 compares the transmission output restricted by the base station with the above-described transmission-output upper limit, and even when a transmission output higher than the transmission-output upper limit is required (including a case where an output value under open-loop or closed-loop control exceeds the transmission-output upper limit), the transmission output is restricted to the transmission-output upper limit to prevent the supply voltage from falling below the operable voltage value.

When the PC card terminal 2103 ends operation at power OFF, the transmission-output upper limit is cleared. The next time the power supply is turned ON, the baseband processor 2106 sets a transmission-output upper limit by following the same procedure. Alternatively, the host device 2101 may store the set transmission-output upper limit so that the stored transmission-output upper limit can be restored in the PC card terminal 2103 when the PC card terminal 2103 is to be used again. Furthermore, the same operation may be carried out, as appropriate, during the subsequent transmission so that the accuracy of the transmission-output upper limit can be increased. In the above-described processing, although a transmission power value known to the baseband processor 2106 is used when a supply voltage measurement value is to be acquired, a measurement section for measuring the transmission power of the transmission circuit 2108 may be provided so that a measurement value of this measurement section can be used.

Processing in the transmission-output upper-limit estimation section 2112 will be described below in detail. A table representing the relationship between transmission power and current consumption of the PC card terminal 2103 is stored in a nonvolatile portion of the memory 2107. It is assumed that to produce this table, the relationship between transmission power and current consumption is measured for a certain number of PC card terminals 2103 or all PC card terminals 2103 at the time of shipment and tracked as representative values or individual adjustment values.

Figure 9:
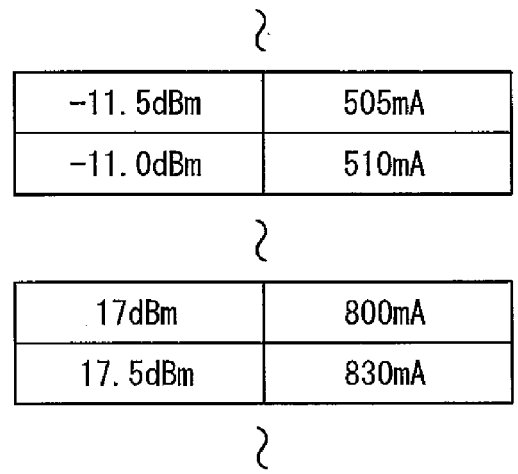
FIG. 9 is a diagram depicting a table indicating the correspondence between transmission power and current consumption.

FIG. 9 is a diagram depicting one example of a table representing the correspondence between transmission power and current consumption. This relationship may be stored in the form of a table representing transmission power and current consumption, as shown in the figure, or may be stored in the form of a function expression such as I=F (W), where I represents current consumption and W represents transmission power.

Figure 10:
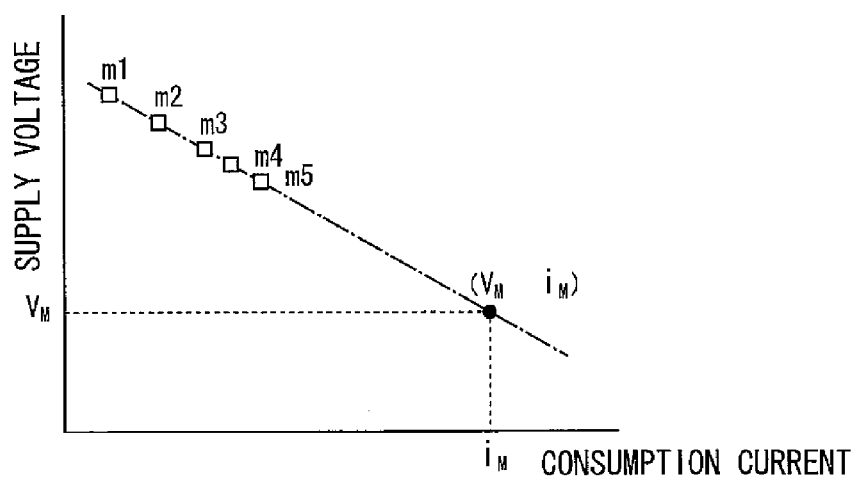
FIG. 10 is a graph showing the relationship between supply voltage and current consumption.

FIG. 10 is a graph depicting the relationship between supply voltage and current consumption. The current description assumes that N measurement results supplied from the baseband processor are N=5. Symbols m1 to m5 represent measurement values, VM represents an operable voltage value, and iM represents a current consumption value corresponding to the operable voltage value VM. The operable voltage value VM represents a minimum value of supply voltage required to allow the PC card terminal to operate normally. This value VM is assumed to be prestored in the memory 2107 (refer to FIG. 7).

As shown in FIG. 10, the current consumption and the supply voltage exhibit a certain degree of linearity. Therefore, with two or more measurement values, the current consumption value iM as indicated when the supply voltage is equal to the operable voltage value VM can be determined. Thus, the current consumption value iM is estimated first from the five measurement values m1 to m5. Next, transmission power corresponding to the current consumption value iM is acquired using the above-described table or function expression to set it as an estimated transmission-output upper limit.

Referring back to FIG. 7, a transmission power upper limit for allowing the PC card terminal 2103 to operate normally in the host device 2101 is estimated through the above-described operation. By setting this value as the maximum transmission power of the PC card terminal 2103, the PC card terminal 2103 can be prevented from being reset or from experiencing unstable operation due to a decrease in the supplied voltage without concern on the user's part. Furthermore, since a technique for setting a transmission-output upper limit when requested transmission processing is performed is employed, the need for transmission operation only for setting a transmission-output upper limit can be eliminated. This allows processing to be carried out without increasing power consumption by, for example, the notebook PC functioning as the host device.

A fifth embodiment of the present invention will now be described. The fifth embodiment can be realized with an apparatus outline structure similar to that in the fourth embodiment shown in FIG. 7, and thus a description of the apparatus outline structure will be omitted. The fifth embodiment differs from the fourth embodiment in processing of the baseband processor. This processing is described below.

Figure 11:
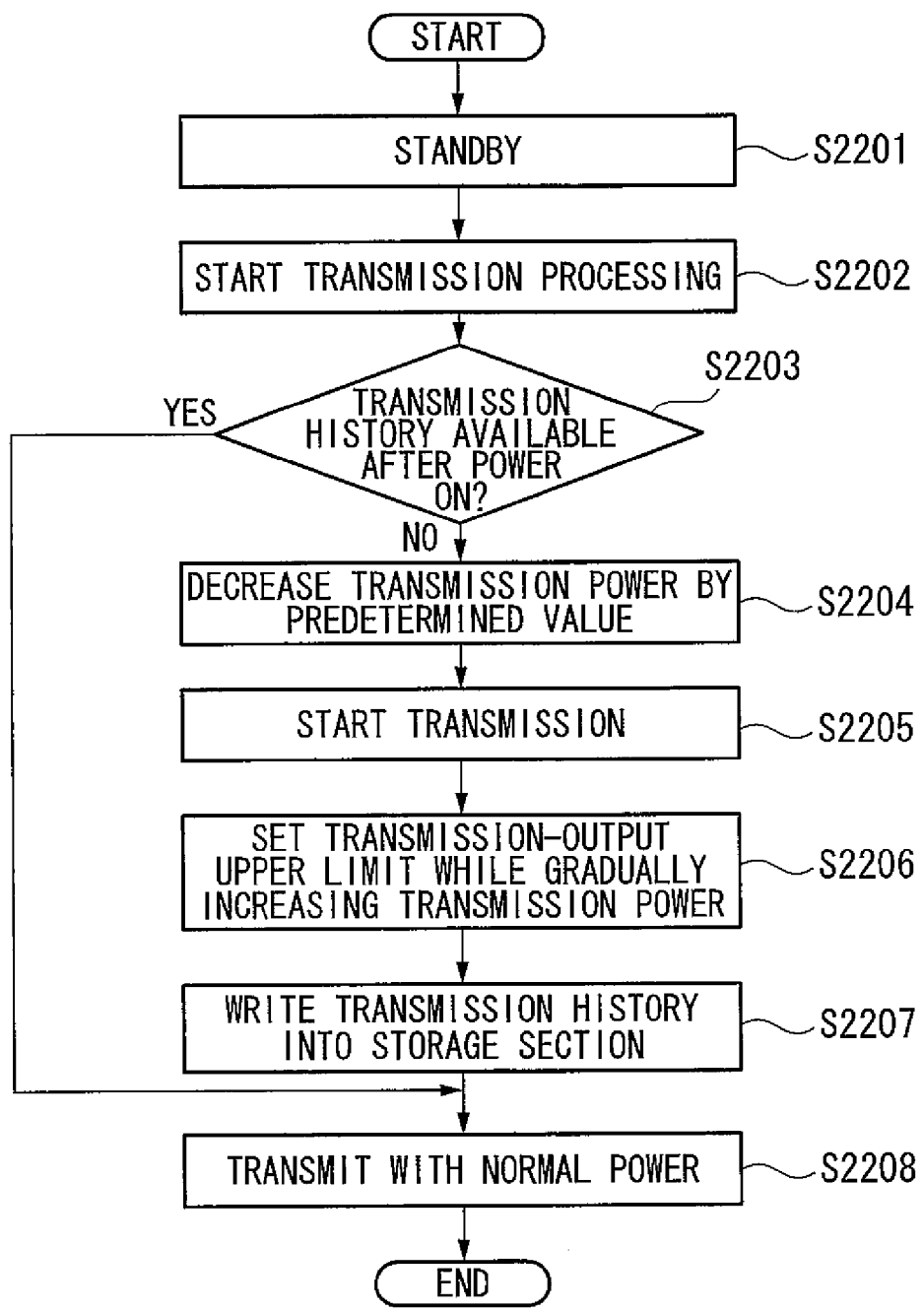
FIG. 11 is a flowchart illustrating the main part for communication control according to a fifth embodiment of the present invention.

FIG. 11 is a flowchart illustrating the main part for communication control according to the fifth embodiment of the present invention. As shown in FIGS. 7 and 11, when the power supply of the PC card terminal 2103 is turned ON by inserting the PC card terminal 2103 in the PC slot 2102 of the host device 2101, the baseband processor 2106 starts up and is subsequently controlled by the host device 2101 using, for example, the AT command.

Next, if transmission is required, transmission processing is started (S2202). It is assumed, however, that transmission is not performed in the transmission processing startup of step S2202. Thereafter, the memory 2107 is referred to to determine if there is a transmission history after power ON (S2203). If there is a transmission history (S2203: Yes), it is determined that an appropriate transmission-output upper limit has already been acquired, and thus the flow proceeds to the normal transmission operation (S2208).

If there is no transmission history, indicating that this is the first transmission (S2203: No), the initial transmission power is decreased by a predetermined value stored in the memory 2107 (S2204). This predetermined value may be a constant value, such as "20 dBm." Alternatively, the predetermined value may be variable depending on the initial transmission power, such as "10 dBm" for initial transmission power <0 dBm, "20 dBm" for 0 dBm initial transmission power <10 dBm, or "30 dBm" for 10 dBm initial transmission power. Furthermore, the predetermined value may be determined as "−20 dBm—initial transmission power." By doing so, a safety margin wide enough to prevent the supply voltage of the PC card terminal 2103 from falling below the operable voltage is ensured even when the power supply performance of the host device 2101 is lower than the standard. Transmission is started with the initial transmission output determined in this manner (S2205).

Next, measurement of transmission power and supply voltage is repeated several times while the transmission power is increased in predetermined steps of the transmission output, and a transmission-output upper limit is acquired in an area where the transmission power is low. Then, the transmission-output upper limit is set in the PC card terminal 2103 (S2206). The transmission-output upper limit is calculated in the same manner as in the fourth embodiment. The above-described increment of transmission power is preset as a smallest possible value, taking into consideration the estimation accuracy of the transmission-output upper-limit estimation section. Thereafter, a transmission history is written in the memory 2107 (S2207). Subsequently, normal transmission is carried out while the maximum transmission power is controlled by means of the transmission-output upper limit (S2208).

In the CDMA2000 1xEV-DO standard, the initial transmission power is determined based on the reception power of the terminal. If the reception power is sufficiently intense, the base station is assumed to be located nearby so that low transmission power is set to avoid interference with other terminals. On the other hand, in a weak electrical field, high transmission power is set to access the base station because the base station is located far away. For this reason, it is possible that transmission starts with high transmission power immediately after the PC card terminal is inserted in the host device.

According to the fifth embodiment, even in such a case, a transmission-output upper limit is set while the transmission power is low, and then normal transmission is initiated. Therefore, the PC card terminal 2103 can be prevented from being, for example, reset due to high transmission output.

A sixth embodiment of the present invention will now be described. As described above, according to CDMA2000 1xEv-DO, the predetermined procedure described below is followed when the base station is to be accessed. First, transmission power is determine based on the reception power. Next, transmission called an access probe is carried out for a predetermined period of time with that transmission power. At this time, communication between the base station and the terminal is started if there is a response from the base station. If there is no response, the transmission power is increased by a predetermined value to transmit another access probe. This process is repeated until a response is received from the base station. In this case, increasing the transmission power is not continued, but this process is repeated while the transmission power is increased the number of times determined by the base station, and then transmission is started again with the transmission power determined from the reception power transmission. Thereafter, this is repeated until a response is received from the base station. If no response is received while this operation is repeated a certain number of times, transmission is aborted. In the sixth embodiment, a transmission-output upper limit is set in this access probe, and will be described below.

Figure 12:
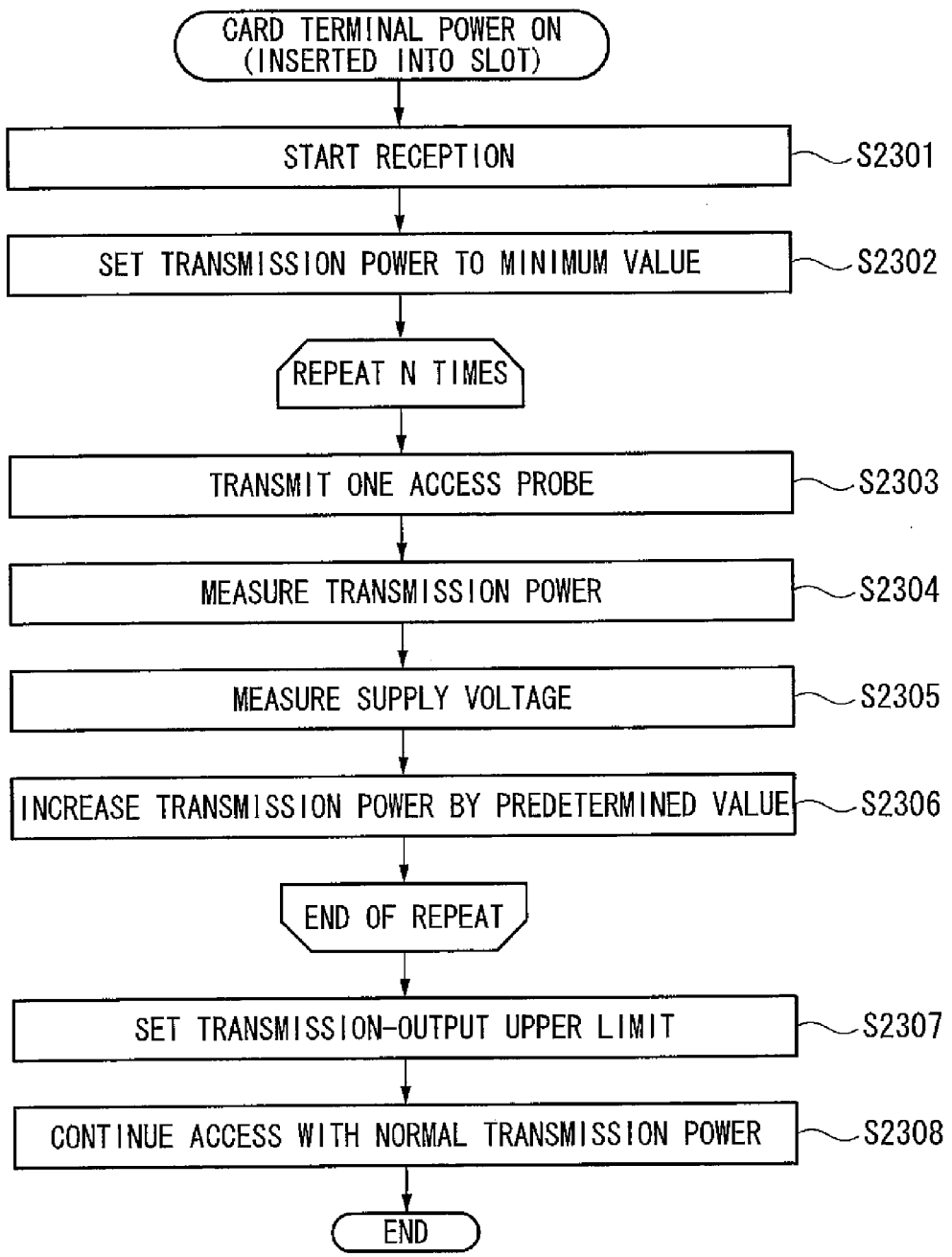
FIG. 12 is a flowchart illustrating the main part for communication control according to a sixth embodiment of the present invention.

FIG. 12 is a flowchart illustrating the outline of communication processing according to the sixth embodiment of the present invention. As shown in FIGS. 7 and 12, when the power is turned ON as a result of the PC card terminal 2103 being inserted in the host device 2101, reception operation is carried out to search for a base station in the vicinity (S2301). When a base station is found, transmission operation is started for registration in the base station. At this time, the transmission power is set to a lowest value (e.g., −25 dBm) (S2302) and one access probe is transmitted (S2303). While the access probe is being transmitted, transmission power and supply voltage are measured (S2304, S2305). Thereafter, the transmission power is increased by the transmission output increment value (e.g., 1 dB) (S2306), and a subsequent access probe is transmitted (S2303). The processing from steps S2303 to S2308 is repeated N times to acquire N measurement results. A transmission-output upper limit is set in the same manner as in the fourth embodiment (S2307), and access to the base station is continued with normal transmission power (S2308).

Figure 13:
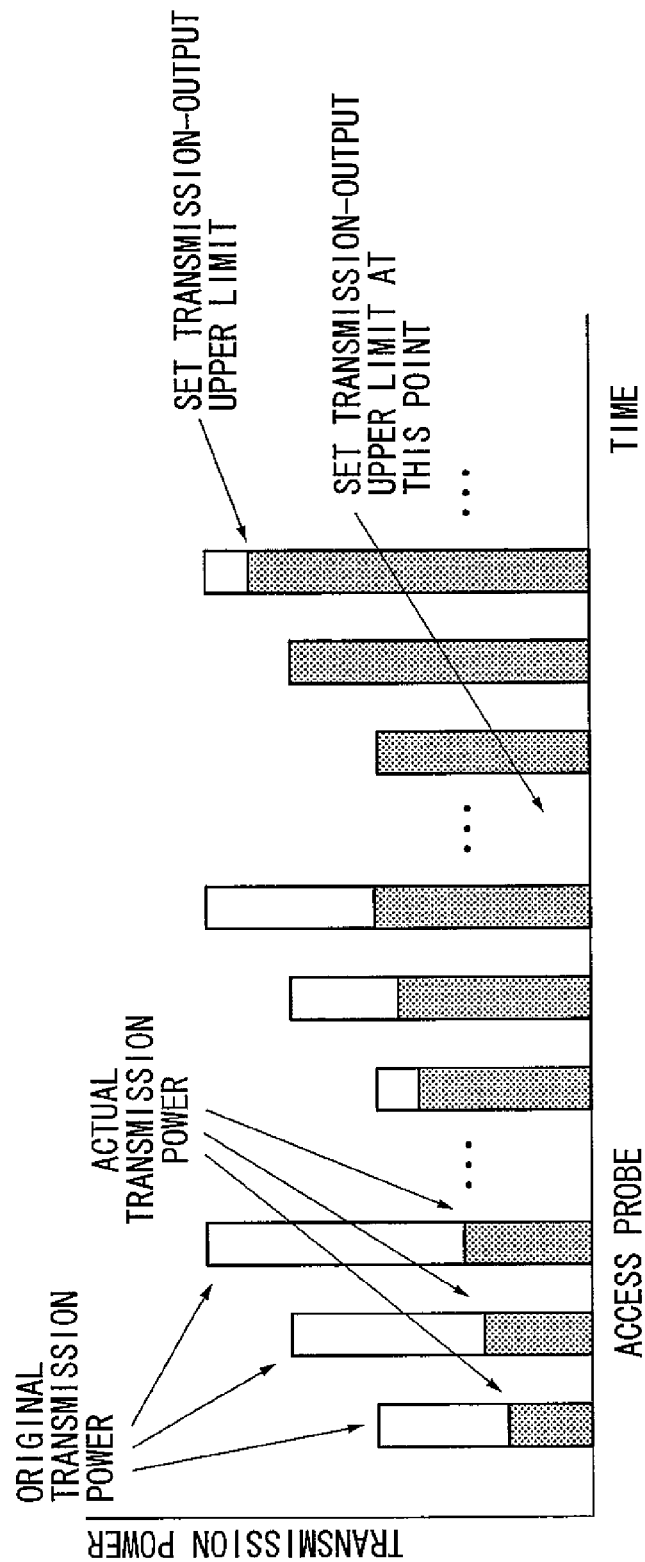
FIG. 13 is a graph depicting one example of communication processing according to the sixth embodiment of the present invention.

FIG. 13 is a graph depicting an exemplary operation according to the sixth embodiment of the present invention. In the figure, the horizontal axis represents time, and the vertical axis represents transmission power. Unshaded areas represent the original transmission power with which transmission should be performed in an access probe, whereas shaded areas represent transmission power with which actual transmission is performed. As shown in the figure, when transmission is started, an access probe is transmitted not with the original transmission power but with the minimum transmission power. Thereafter, the transmission power is increased in a stepwise manner, access probe is continued, N measurement results are obtained, and a transmission-output upper limit is set. Then, access probe is carried out with the original transmission output. If the transmission output exceeds the transmission-output upper limit, the transmission output is restricted to the transmission-output upper limit for transmission.

As described above, since a transmission-output upper limit can be set during access probe available to the known method, a transmission-output upper limit can be set for a short period of time without concern on the user's part.

Embodiments according to the present invention will now be described with reference to the drawings. The current description assumes examples where a 32-bit PC card communication terminal in accordance with the CDMA2000 1xEV-DO standard is used.

Figure 14:
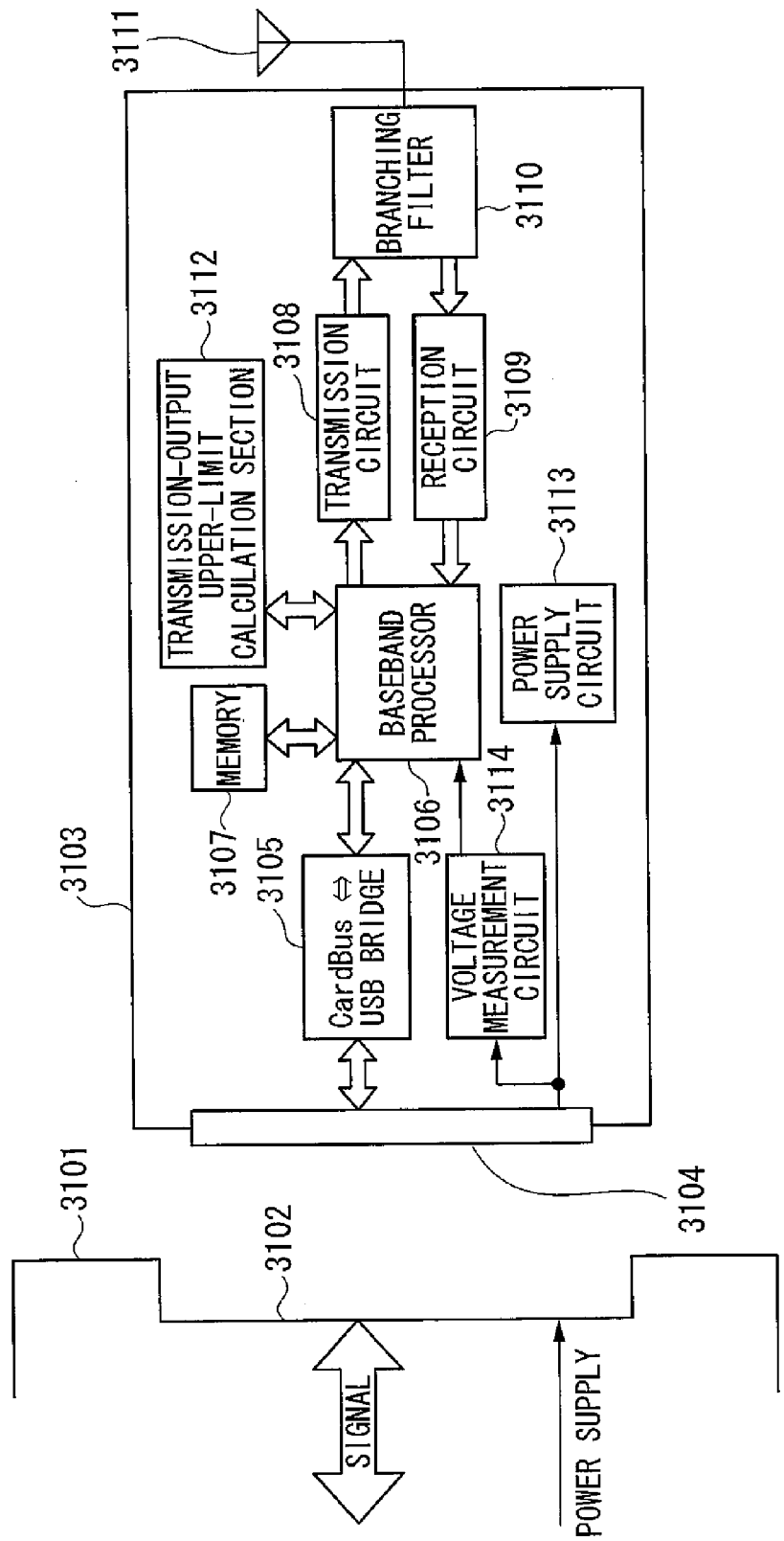
FIG. 14 is a schematic block diagram depicting the structure of a PC card communication terminal according to a seventh embodiment of the present invention.

FIG. 14 is a schematic block diagram depicting the structure of a PC card communication terminal according to a seventh embodiment of the present invention. In the same figure, reference numeral 3101 denotes a host device, such as a so-called notebook PC, having a PC card slot 3102. Reference numeral 3103 denotes a PC card terminal which includes a 32-bit Card Bus connector 3104. This PC card terminal 3103 is mounted in the host device 1 for use and is supplied with power from the host device 3101 to operate, controlled using, for example, the AT command.

In this PC card terminal 3103, reference numeral 3105 denotes a bridge that connects a Card Bus and a USB (universal serial bus), reference numeral 3106 denotes a baseband processor that performs communication control, reference numeral 3107 denotes a memory used by the baseband processor 3106, reference numeral 3108 denotes a transmission circuit, reference numeral 3109 denotes a reception circuit, reference numeral 3110 denotes a branching filter, and reference numeral 3111 denotes an antenna. These components are realized by a general structure, and a description thereof will be omitted.

Reference numeral 3112 denotes a transmission-power upper-limit calculation section for calculating a transmission power upper limit. If the baseband processor 3106 and a DSP (digital signal processor), not shown in the figure, are made to read a predetermined program and employ, for example, a method for carrying out predetermined calculation processing, the transmission-power upper-limit calculation section can be realized with an existing hardware configuration.

The line of power supplied from the host device 3101 is connected to a power supply circuit 3113 and a voltage measurement circuit 3114. The power supply circuit 3113 produces voltage to be supplied to components in the card terminal. Power supply routes to components are not shown in the figure. The voltage measurement circuit 3114 measures the supply from the host device 3101 under the control of the baseband processor 3106.

Figure 15:
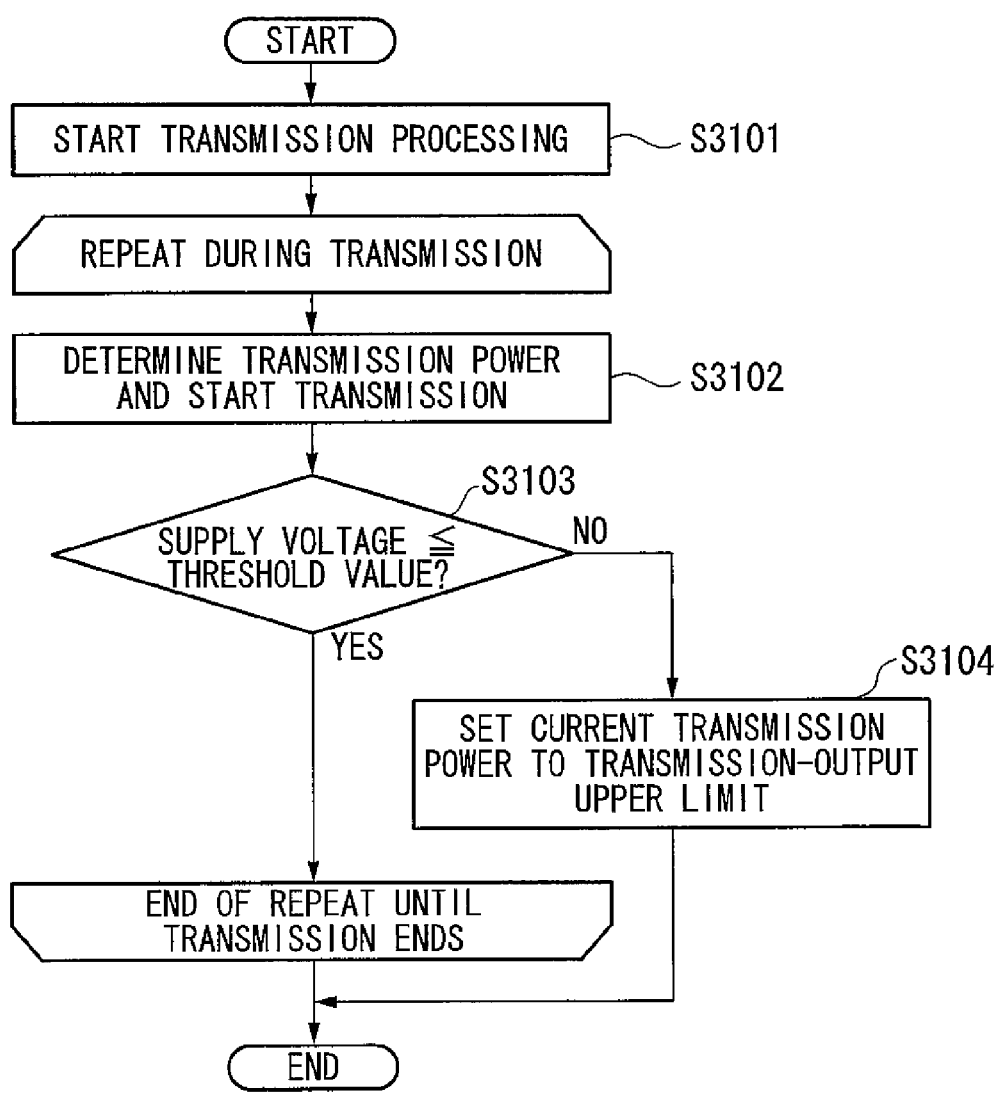
FIG. 15 is a flowchart illustrating the main part for communication control according to the seventh embodiment of the present invention.

The operation of a card communication terminal according to this embodiment will now be described. FIG. 15 is a flowchart illustrating the main part for communication control according to the seventh embodiment. Referring to FIGS. 14 and 15, when the power supply of the PC card terminal 3103 is turned ON by inserting the PC card terminal 3103 in the PC slot 3102 of the host device 3101, the baseband processor 3106 starts up and performs communication processing by following the procedure below.

First, the baseband processor 3106 performs transmission start processing before starting transmission (S3101). During the transmission processing, transmission power is determined, for example, from the reception power and the transmission power to start transmission (S3102). When transmission is performed, the transmission-power upper-limit calculation section 3112 measures a supply voltage VS using the voltage measurement circuit 3114 and compares the result with a threshold VT (S3103). The threshold VT is a value where a margin Vm is taken into consideration for a permissible lowest supply voltage value VM (=VM+Vm). The margin Vm is a value for setting a voltage range based on which it is determined that the supply voltage VS is sufficiently close to but not below the permissible lowest supply voltage value VM.

The permissible lowest supply voltage value VM is a value preset as a permissible lowest value of the supply voltage at which the internal circuit of the PC card terminal 3103 can operate normally. This value may be set in accordance with the standard or may be set as a representative value or an individual adjustment value by performing operation check of a certain number of PC card terminals 3103 or all PC card terminals 3103 at the time of shipment. In addition, if a sufficiently wide margin can be expected for the permissible lowest supply voltage value VM, such as when there is a margin for the limit value although a standard value has been employed as the permissible lowest supply voltage value VM, then the permissible lowest supply voltage value VM can be set as the threshold VT without providing the margin Vm.

If it is determined in step S3103 that the supply voltage VS is larger than the threshold VT (S3103: Yes), the terminal can successfully operate and therefore continues transmission. Thereafter, the processing in step S3102 and the subsequent processing are repeated until the transmission ends. Furthermore, if it is determined in step S3103 that the supply voltage VS is equal to or lower than the threshold VT (S3103: No), it indicates that the transmission power at this time is close to a limit at which the internal circuit of the PC card terminal 3103 can normally operate and furthermore, transmission has already been performed normally. Thus, the transmission power at this time is stored in the memory 3107 as a transmission power upper limit, setting for controlling the maximum transmission power of the PC card terminal 3103 using this transmission power upper limit (S3104) is performed, and a series of operations end.

In the CDMA2000 1xEV-DO standard, the base station restricts transmission power to the PC card terminal 3103. However, after a transmission power upper limit has been acquired through the above-described series of operations, the baseband processor 3106 compares the transmission power restricted by the base station with the above-described transmission power upper limit, and even when transmission power higher than the transmission power upper limit is required (including a case where an output value under open-loop or closed-loop control exceeds the transmission power upper limit), the transmission power is restricted to the transmission power upper limit to prevent the supply voltage from falling below the operable voltage value.

When the PC card terminal 3103 ends operation at power OFF, the transmission power upper limit is cleared. The next time the power supply is turned ON, the transmission-power upper-limit calculation section 3112 sets a transmission power upper limit by following the same procedure. Alternatively, a transmission power upper limit that has been set may be stored by the host device 3101 so that the stored transmission power upper limit may be restored in the PC card terminal 3103 when the PC card terminal 3103 is to be used again.

By obtaining a transmission power upper limit at which the PC card terminal 3103 can normally operate with the power supply performance of the host device 3101 and then setting the value as the maximum transmission power of the PC card terminal 3103 through the above-described operation, the PC card terminal 3103 can be prevented from being reset or from experiencing unstable operation due to a decrease in the supplied voltage without imposing particular operation upon the user. Furthermore, since a technique for setting a transmission power upper limit during transmission processing is employed, the need for transmission operation only for setting a transmission power upper limit is eliminated. This affords an advantage in that, for example, the notebook PC functioning as the host device is saved from having to particularly increase power consumption.

An eighth embodiment of the present invention will now be described. The eighth embodiment can be realized with an apparatus outline structure similar to that in the seventh embodiment shown in FIG. 14, and thus a description of the apparatus outline structure will be omitted. The eighth embodiment differs from the seventh embodiment in arithmetic operation of a transmission power upper limit, which is described below.

Figure 16:
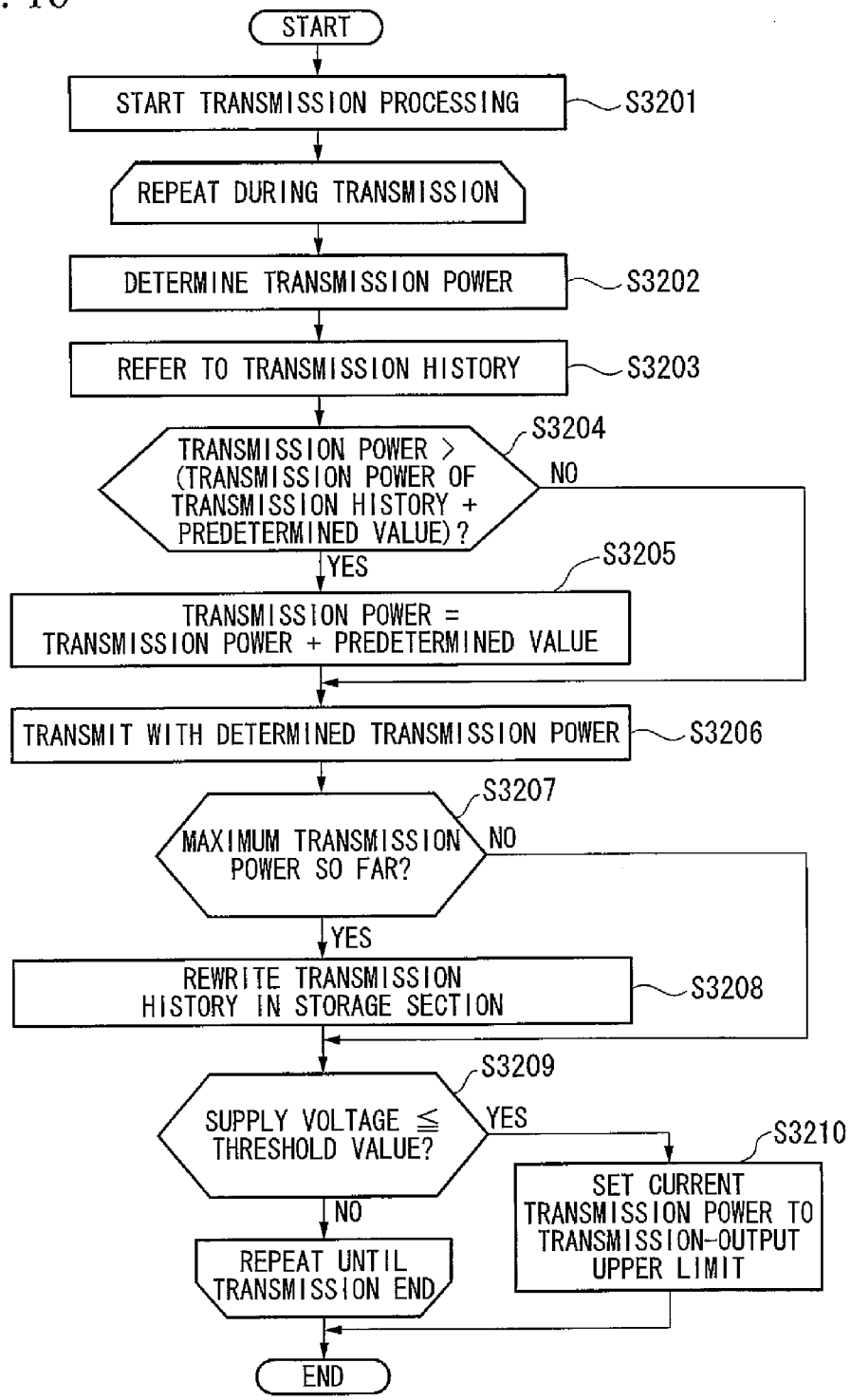
FIG. 16 is a flowchart illustrating the main part for communication control according to the seventh embodiment of the present invention.

FIG. 16 is a flowchart illustrating the main part for communication control according to the eighth embodiment. Referring to FIGS. 14 and 16, when the card terminal is to perform transmission, the baseband processor 3106 first enters transmission processing (S3201). After the transmission processing has been entered, the baseband processor 3106 calculates and determines transmission power for transmission based on, for example, the reception state and base station's instruction (S3202). Next, the transmission history in the memory 3107 is referred to (S3203).

Here, the transmission history is information to be written to the memory 3107 in step S3208, which will be described later. More specifically, a highest transmission power value WM, which is the largest of all transmission power values after the PC card terminal 3103 has been turned ON so far, is written. This transmission history may be additionally provided with, for example, the supply voltage VS at the time of transmission with the highest transmission power value WM. In short, it is sufficient if transmission history includes the highest transmission power so far and information indicating that the supply voltage VS at that time is below the threshold VT.

Thereafter, the transmission power determined in step S3202 is compared with a trial transmission power value WT (maximum transmission power value WM+predetermined value ΔW) (S3204). Here, the predetermined value ΔW is a trial increment of the transmission power for ensuring that the amount of drop in the supply voltage VS is within the margin Vm, and can simply be set to a sufficiently small value (e.g., 1 dB) to leave a wide margin.

As a result, if the current transmission power is larger than the trial transmission power value WT (S3204: Yes), the trial transmission power value WT is set to the transmission power (S3205) to perform transmission (S3206). Furthermore, if the current transmission power is smaller than the trial transmission power value WT (S3204: No), transmission is performed with the current transmission power (S3206).

Thereafter, the transmission power with which transmission has been performed this time is compared with the highest transmission power value WM (S3207). If the current transmission power exceeds the highest transmission power value WM (S3207: Yes), the transmission history is updated with the current transmission power as the highest transmission power value WM (S3208). If the current transmission power is below the highest transmission power value WM (S3207: No), the flow proceeds to the next step without updating the transmission history. For the initial value of the transmission history, a sufficiently small transmission power value can simply be set.

Thereafter, the supply voltage VS at that transmission power is measured by the voltage measurement circuit 3114 to compare it with the threshold VT (S3209). If the supply voltage VS is below the threshold VT as a result, the current transmission power is set to a transmission power upper limit, confidently assuming that the current transmission power is an output sufficiently close to a limit at which normal transmission operation is possible with the power supply performance of the host device 3101 (S3210). If the supply voltage VS exceeds the threshold VT (S3209: No), the flow returns to step S3202, assuming that the output still has a margin, and processing is continued without setting a transmission power upper limit.

For the CDMA2000 1xEV-DO standard, the initial transmission power is determined based on the reception power of the terminal. If the reception power is sufficiently intense, the base station is assumed to be located nearby so that low transmission power is set to avoid interference with other terminals. On the other hand, in a weak electrical field, high transmission power is set to access the base station because the base station is located far away. For this reason, it is possible that transmission starts with high transmission power immediately after the PC card terminal is inserted in the host device.

According to the eighth embodiment, even in such a case, transmission is carried out while the trial transmission power value WT is increased in a stepwise manner starting at a low transmission power level, and therefore, the PC card terminal 3103 can be prevented from being, for example, reset not only after but also before a transmission power upper limit is set.

Although embodiments of the present invention have been described with reference to the drawings, specific structures are not limited to these embodiments. Instead, design without departing from the spirit and scope of the present invention also constitutes the present invention.

The invention claimed is:

1. A method of controlling a wireless communication terminal that is supplied with power supply from a host device for operation, the wireless communication terminal being mounted in the host device, the method comprising the steps of:
   measuring a voltage of the power supply;
   setting a transmission-output upper limit; and
   restricting a maximum transmission output based on the transmission-output upper limit,
   wherein the transmission-output upper limit is set to a transmission power which is employed when the measured voltage is at a preset lowest permissible operational voltage of the wireless communication terminal.

2. A wireless communication terminal mounted in a host device and supplied with power supply from the host device for operation, comprising:
   a supply-voltage measurement section for measuring a voltage value of the power supply;
   a transmission-output upper-limit setting section for setting a transmission-output upper limit; and
   a transmission-output control section for restricting a maximum transmission output based on the transmission-output upper limit,
   wherein the transmission-output upper-limit setting section sets the transmission-output upper limit to a transmission power which is employed when the measured voltage is at a preset lowest permissible operational voltage of the wireless communication terminal.

3. A method of controlling a wireless communication terminal that is supplied with a power supply from a host device for operation, the wireless communication terminal being mounted in the host device, the method comprising the steps of:
   measuring a voltage of the power supply;
   setting a transmission-output upper limit; and
   restricting a maximum transmission output based on the transmission-output upper limit,
   wherein the transmission-output upper limit is set to a transmission power which is employed when the measured voltage is sufficiently close to a preset lowest permissible operational voltage of the wireless communication terminal.

4. A wireless communication terminal mounted in a host device and supplied with a power supply from the host device for operation, comprising:
   a supply-voltage measurement section for measuring a voltage value of the power supply;
   a transmission-output upper-limit setting section for setting a transmission-output upper limit; and
   a transmission-output control section for restricting a maximum transmission output based on the transmission-output upper limit,
   wherein the transmission-output upper-limit setting section sets the transmission-output upper limit to a transmission power which is employed when the measured voltage is sufficiently close to a preset lowest permissible operational voltage of the wireless communication terminal.

* * * * *